United States Patent
Kraiger et al.

(10) Patent No.: US 10,521,750 B2
(45) Date of Patent: Dec. 31, 2019

(54) COMPUTER IMPLEMENTED METHOD FOR PERSONAL ATTRIBUTE VALUATION AND MATCHING WITH OCCUPATIONS AND ORGANIZATIONS

(71) Applicant: Career Analytics Network, Inc., Fort Collins, CO (US)

(72) Inventors: Kurt Kraiger, Fort Collins, CO (US); Bryan J. Dik, Fort Collins, CO (US)

(73) Assignee: Career Analytics Network, Inc., Fort Collins, CO (US)

( * ) Notice: Subject to any disclaimer, the term of this patent is extended or adjusted under 35 U.S.C. 154(b) by 890 days.

(21) Appl. No.: 14/637,331

(22) Filed: Mar. 3, 2015

(65) Prior Publication Data
US 2015/0248632 A1    Sep. 3, 2015

Related U.S. Application Data

(60) Provisional application No. 61/947,301, filed on Mar. 3, 2014.

(51) Int. Cl.
   *G06Q 10/06*  (2012.01)
(52) U.S. Cl.
   CPC .............. *G06Q 10/06393* (2013.01)
(58) Field of Classification Search
   None
   See application file for complete search history.

(56) References Cited

U.S. PATENT DOCUMENTS

| | | | |
|---|---|---|---|
| 6,735,568 B1 | 5/2004 | Buckwalter et al. | |
| 8,082,168 B1 | 12/2011 | Judy | |
| 8,639,547 B1* | 1/2014 | Judy | G06Q 10/105 705/7.11 |
| 2006/0212337 A1* | 9/2006 | Vayghan | G06Q 10/06311 705/7.14 |
| 2008/0027771 A1* | 1/2008 | Steel | G06Q 10/00 705/7.14 |
| 2009/0006178 A1* | 1/2009 | Taylor | G06Q 10/06311 705/7.32 |
| 2010/0223267 A1* | 9/2010 | Marshall | G06Q 10/06 707/749 |
| 2010/0241635 A1* | 9/2010 | Derosear | G06Q 10/1053 707/749 |
| 2013/0031015 A1* | 1/2013 | Schneider | G06Q 10/06311 705/321 |

(Continued)

OTHER PUBLICATIONS

PCT International Patent Application No. PCT/US15/18548; International Search Report and the Written Opinion of the International Searching Authority dated Jun. 17, 2015; 13 pages total.

(Continued)

*Primary Examiner* — Patricia H Munson
*Assistant Examiner* — Sarjit S Bains
(74) *Attorney, Agent, or Firm* — Craig R. Miles; CR Miles P.C.

(57) ABSTRACT

A computer implemented system and method for personal attribute valuation and match with occupations and organizations which provides computer elements and computer code which functions to calculate a congruence index which provides an objective measure of person to occupation fit and person to organization fit.

18 Claims, 23 Drawing Sheets

(56) References Cited

U.S. PATENT DOCUMENTS

| | | | | |
|---|---|---|---|---|
| 2014/0046862 | A1* | 2/2014 | Weingarten | G06Q 10/00 |
| | | | | 705/321 |
| 2014/0172732 | A1* | 6/2014 | Baladi | G06Q 10/1053 |
| | | | | 705/321 |
| 2015/0095318 | A1* | 4/2015 | Burrus | G06F 17/3053 |
| | | | | 707/723 |
| 2015/0161567 | A1* | 6/2015 | Mondal | G06Q 10/1053 |
| | | | | 705/321 |

OTHER PUBLICATIONS

U.S. Appl. No. 61/947,301, filed Mar. 3, 2014.

Cable et al. Interviewers' Perceptions of Person-Organization Fit and Organizational Selection Decisions. Journal of Applied Psychology, 1997, vol. 82, No. 4, pp. 546-561.

Cable et al. Person-Organization Fit, Job Choice Decisions, and Organizational Entry. Organizational Behavior and Human Decision Processes, 1996, vol. 67, No. 3, pp. 294-311.

Caldwell et al. Measuring Person-Job Fit With a Profile-Comparison Process. Journal of Applied Psychology, 1990, vol. 75, No. 6, pp. 648-657.

O'Reilly III et al. People and Organizational Culture: a Profile Comparison Approach to Assessing Person-Organization Fit. Academy of Management Jourmal, 1991,34(3), pp. 487-516.

Sarros et al. The Organizational Culture Profile Revisited and Revised: An Australian Perspective. Australian Journal of Management, Jun. 2005, vol. 30, No. 1, pp. 159-182.

Goodwin et al. Understanding correlation: Factors that affect the size of r. Journal of Experimental Education, 2006, 74 (3), pp. 251-266.

Goldberg. The development of markers for the Big-Five factor structure. 1992, Psychological Assessment, vol. 4, No. 1, pp. 26-42.

Arthur Jr. et al. The Use of Person-Organization Fit in Employment Decision Making: An Assessment of Its Criterion-Related Validity. Journal of Applied Psychology, Aug. 2006, vol. 91, No. 4, pp. 786-801.

Assoulfne et al. Meta-Analysis of the Relationship between Congruence and Well-Being Measures. Journal of Vocational Behavior, Dec. 1987, vol. 31, Issue 3, pp. 319-332.

Brown et al. An Evaluation of Interest Congruence Indices: Distribution Characteristics Measurement Properties. Journal of Vocational Behavior, Dec. 1994, vol. 45, Issue 3, pp. 310-327.

Camp et al. A Comparison and Evaluation of Interest Congruence Indices. Journal of Vocational Behavior, Oct. 1992, vol. 41, Issue 2, pp. 162-182.

Dik et al. An Empirical Test of the Modified C Index and SII, O*NET, and DHOC Occupational Code Classifications. Journal of Career Assessment, Aug. 2007, vol. 15, Issue 3, pp. 279-300.

Dik et al. The Flip Side of Holland Type Congruence: Incongruence and Job Satisfaction. The Career Development Quarterly. Jun. 2010, vol. 58, pp. 352-358.

Hoeglund et al. Holland-style Measures of Congruence: Are Complex Indices More Effective Predictors of Satisfaction? Journal of Vocational Behavior, 1999, vol. 54, Issue 3, pp. 471-482.

Kristof-Brown et al. Consequences of Individual's Fir at Work: A Meta-Analysis of Person-Job, Person-Organization, Person-Group, and Person-Supervisor Fit. Personnel Psychology, Jun. 2005, vol. 58, Issue 2, pp. 281-342.

My Next Move. Website, https://www.mynextmove.org, originally downloaded Jun. 24, 2015, 1 page.

My Next Move for Veterans. Website, https://www.mynextmove.org, originally downloaded Jun. 24, 2015, 1 page.

Nye et al. Vocational Interests and Performance: A Quantitative Summary of Over 60 Years of Research. Perspectives on Psychological Science, Jul. 2012, vol. 7, No. 4, pp. 384-403.

O*NET Academy. Website, https://www.onetcodeconnector.org, orginally downloaded Jun. 24, 2015, 1 page.

O*NET Code Connector. Website, https://www.onetcodeconnector.org, orginally downloaded Jun. 24, 2015, 1 page.

O*NET Online. Website, https://www.onetonline.org, orginally downloaded Jun. 24, 2015, 1 page.

O*NET Resource Center. Website, https://www.onetcenter.org, orginally downloaded Jun. 24, 2015, 1 page.

Rounds et al. Measurement of Person-Environment Fit and Prediction of Satisfaction in the Theory of Work Adjustment. Journal of Vocational Behavior, Nov. 1987, vol. 31, Issue 3, pp. 297-318.

Rounds. The Comparative and Combined Utility of Work Value and Interest Data in Career Counseling with Adults. Journal of Vocational Behavior, Aug. 1990, vol. 37, Issue 1, pp. 32-45.

Tranberg et al. The relation between Interest Congruence and Satisfaction: A Meta-Analysis. Journal of Vocational Behavior, 1993, vol. 42, pp. 253-264.

Tsabari et al. Updated Meta-Analysis on the Relationship Between Congruence and Satisfaction. Journal of Career Assessment, May 2005, vol. 13, No. 2, pp. 216-232.

U.S. Department of Labor, Employment and Training Administration. Computerized Interest Profiler, User's Guide. 2002, 84 pages total.

U.S. Department of Labor, Employment and Training Administration. Interest Profiler, Instrument. 2000, 12 pages total.

U.S. Department of Labor, Employment and Training Administration. Interest Profiler, User's Guide. 2000, 68 pages total.

U.S. Department of Labor, Employment and Training Administration. Work Importance Locator, Instrument. 2000, 12 pages total.

U.S. Department of Labor, Employment and Training Administration. Work Importance Locator, User's Guide. 2000, 55 pages total.

U.S. Department of Labor, Employment and Training Administration. Work Importance Profiler, User's Guide. 2002, Washington, D.C., 76 pages total.

U.S. Department of Labor, Employment and Training Administration. O*NET—beyond information—intelligence. Website, http://www.doleta.gov, originally downloaded Jun. 24, 2015, 2 pages total.

Van Iddekinge et al. Are You Interested? A Meta-Analysis of Relations Between Vocational Interests and Employee Performance and Turnover. Journal of Applied Psychology, Nov. 2011, vol. 96, Issue 6, pp. 1167-1194.

Verquer et al. A meta-analysis of relations between person-organization fit and work attitudes. Journal of Vocational Behavior, Dec. 2003, vol. 63, Issue 3, pp. 473-489.

Young et al. Congruence Revisited: Do 11 Indices Differentially Predict Job Satisfaction and Is the Relation Moderated by Person and Situation Variables? Journal of Vocational Behavior, 1998, vol. 52, pp. 208-223.

Bruner et al. Emotional Selectivity in Perception and Reaction. Journal of Personality, Sep. 19947, 16(1):69-77.

Coward et al. Linearity of Ability-Performance Relationships: A Reconfirmation. Journal of Applied Psychology, Jun. 1990, 75(3):297-300.

Kristof-Brown et al. Consequences of Individual's Fit at Work: A Meta-Analysis of Person-Job, Person-Organization, Person-Group, and Person-Supervisor Fit. Personnel Psychology, Jun. 2005, vol. 58, Issue 2, pp. 281-342.

Nye et al. Interests as predictors of performance: An omitted and underappreciated variable. Journal of Vocational Behavior, Aug. 2018, 108:178-189.

Richardson. Eta squared and partial eta squared as measures of effect size in educational research. Educational Research Review, 2011, 6(2):135-147.

Dawis et al. A psychological theory of work adjustment. An individual-differences model and its applications. 1984, University of Minnesota Press.

Edwards. Person-job fit: A conceptual integration, literature review, and methodological critique. In: International review of industrial and organizational psychology, Aug. 1991, vol. 6, pp. 283-357, New York, Wiley.

Holland. Making vocational choices: A theory of vocational personalities and work environments (3rd ed.) Jun. 1997, Psychological Assessment Resources, Odessa, FL.

* cited by examiner

FIG. 4

Values

You are about to take an assessment that will help you clarify what is most important to you in a job.

Remember:

1. There are no right or wrong answers. You are simply trying to beter understand what is important to you.

2. There is no time limit. Take your time.

In the first part of this assessment, a series of items will ask you to put in order - from most important to least important - five statements about your ideal job. Simply click and drag the most important statement to you to the top, the next most important statement to the second slot, and so forth, until the statements are listed in order from most to least important. In the last part of this assessment, you will check the box in front of those values which in an ideal job are most important to you.

0%

59 back | next

Question 1

In my IDEAL JOB, it is important that....

| | |
|---|---|
| Most Important | ...I make use of my abilities. 68 |
| | ...my pay would compare well with that of other workers. 68 |
| | ...I would be looked up to by others in my company and my community. 68 |
| | ...I could receive recognition for what I do. 68 |
| Least Important | ...I could do something different every day. 68 |

69

60

44

(Instructions: Drag Values - most important to top, least to bottom)

70 back    next

*FIG. 7*

Interests

75

The following questions describe work activities that some people do at their jobs. Read each question carefully and decide wheather or not you would like to do the activity.

Try not to think about:
(1) Whether you have enough education or training to perform the activity, or
(2) How much money you would make performing the activity.

Simply think about whether you would "like" or "dislike" performing the work activity. Points to remember:
(1) This is not a test! There are no right or wrong answers to the questions. The goal is for you to learn
(2) There is no time limit for completing the questions. Take your time.

0%

11/13 back | next

FIG. 10

Personality

11/13

0%

97

The following statements are designed to assess aspects of your personality. For each statement, describe yourself as accurately as you can.

Make sure to:
(1) Describe yourself as you generally are now, not as you wish to be in the future.
(2) Describe yourself as you honestly see yourself, in relation to other people you know of the same sex as you are, and roughly your same age.

Indicate for each statement whether it is

Very accurate:
Moderately Inaccurate:
Neither Accurate Nor Inaccurate:
Moderately Accurate: or
Very Accurate as a description of you.

back  next

FIG. 13

Workplace Preferences

The statements that follow are designed to assess what you see as the ideal workplace. For each statement, ask yourself:

"How important is it for this characteristic to be a part of my workplace?"

Then rate each statement using the following scale:

Not At All
Minimally
Moderately
Considerably and
Very Much.

117

0%

11/13 back next

FIG. 16

Job Fit Filters 139

Filter By:
- ▶ ☑ Job Zone —142
- ▶ ☑ Job Family —148
- ▼ ☑ Industry —151

141
- ☐ Accommodation and Food Services
- ☑ Administrative and Support Services
- ☐ Agriculture, Forestry, Fishing, and Hunting
- ☐ Arts, Entertainment, and Recreation
- ☐ Construction
- ☑ Educational Services
- ☐ Finance and Insurance
- ☑ Government
- ☐ Health Care and Social Assistance
- ☐ Information

[154 Apply]  [Clear]

Occupation Fit Results 140

| Occupation Title 137 | Match Quality 177 176 165 | Job Zone |
|---|---|---|
| Desktop Publishers —174 | ● Strong ## 175 178 | Zone 3 |
| Archeologists —174 | ● Strong 175 | Zone 5 |
| Astronomers —174 | ● Strong 175 | Zone 5 |
| Architectural Drafters —174 | ● Strong 175 | Zone 4 |
| Set and Exhitibit Designers —174 | ● Strong 175 | Zone 4 |
| Anthropologists —174 | ● Strong 175 | Zone 5 |
| Geographers —174 | ● Strong 175 | Zone 5 |
| Soil and Plant Scientists —174 | ● Strong 175 | Zone 5 |
| Film and Video Editors —174 | ● Strong 175 | Zone 3 |
| Architects, Except Landscape and Naval —174 | ● Strong 175 | Zone 5 |

Desktop Publishers

Format typescript and graphic elements using computer software to produce publication-ready material.

| Alternate Job Titles | Full Job Description |
|---|---|
| ○ Advertising Associates<br>○ Art Director<br>○<br>○ Computer Operator<br>○ Computer Publisher<br>○ Computer Typesetter<br>○ Creator Director<br>○ Design Editor<br>○ Desk Top Publisher<br>○ Desktop Publishing Specialist | 179 |

FIG. 17B

Summary Report for:
43-9031.00 - Desktop Publishers

Format typescript and graphic elements using computer software to produce publication-ready material.

Sample of reported job titles: Computer Typesetter, Art Director, Electronic Console Display Operator, Graphic Artist, Mac Operator, Production Manager, Desktop Publishing Specialist, Electronic Imager, Advertising Associate, Creator Director View report: [Summary] [Details] [Custom]

Tasks  Tools & Technology  Knowledge  Skills  Abilities  Work Activities  Work Comprise  Job Zone  Education  Interests  Work Styles  Work Values  Related Occupations  Wages and Employment  Job Openings  Additional Information

Tasks
180

- Check preliminary and final proofs for errors and make necessary corrections.
- Operate desktop publishing software and equipment to design, lay out, and produce camera-ready copy.
- Position text and art elements from a variety of databases in a visually appealing way to design print or web pages, using knowledge of type styles and size and layout patterns.
- Convert various types of files for printing or for the internet, using computer software.
- Transmit, deliver or mail publication master to printer for production into film and plates.
- Study layout or other design instructions to determine work to be done and sequence of operations.
- Enter digitized data into electronic prepress system computer memory, using scanner, camera, keyboard, or mouse.
- View monitors for visual representation of work in progress and for instructions and feedback throughout process, making modifications as necessary.
- Import text and art elements such as electronic clip-art or electronic files from photographs that have been scanned or produced with a digital camera, using computer software.
- Collaborate with graphic artists, editors and writers to produce master copies according to design specifications.

FIG. 18

| FISCL Results | Custom Results | Users | Talent Match | Customize |

Use this tool to find candidates who match your position openings, and company culture.

Candidate Pool

Select those user groups, or specific users which are to be included in the match.

Select Groups to Match
- Applicants
- Employees
- Leaders
- Sales Group

Candidate Pool

Clear Pool

Select Specific Users to Match

Weighting

Use the slider below to indicate the weighting for fit to job and fit to culture.

Fit to Position 50%          Fit to Culture 50%

Position

Select the position you are matching from the list below.

- Chief Anything
- Lawyer
- Marketing Specialist
- Sales Associate
- Sales REP / Cold call and negotiation

Culture

Select whether you are matching to your existing culture, or your company's desired culture below.

Existing Culture    Desired Culture
     ○                   ○ if you are matching the culture of an existing group, select the group below.

- Employees
- Leaders
- Sales Group

Search for Matches!

FIG. 20

Candidate VIP Profile

Travis Hevelone
travis@jobzology.com

Values: 196/197

Achievement:
- Need to make the most of their abilities on the job.
- Need to feel a sense of accomplishment from their work.

Relationships:
- Appreciate having co-workers they get along with.
- Need to be of service to others.
- Need to avoid environments in which they are forced to go against their sense of right and wrong.

Interests:

Investigative interests:
- Like exploring ideas, asking intellectual questions, and seeking answers to those questions.
- Like to search for facts and figure out problems mentally.
- Enjoy math, science, and research, and appreciate having independence inhow they approach their work.

Artistic interests:
- Other enjoy creatiing things, but on a more basic level, they enjoy activities that allow for self-expression.
- Like work that deals with the artistic side of things, defined broadly to include visual arts but also writing, music, drama, dance, and other activities that involve forms, designs, and patterns.
- Prefer settings where worrk can be done without following a clear set of rules.

Personality:

Moderate-to-high score on Openness to Experience.
- People with scores like this tend to have above-average levels of creativity, imaginativeness, curiosity, open-mindedness, and wittiness. At the workplace, others may see you as someone who often enjoys creating new plans, likes complexity, appreciates innovation and change, and prefers a broad vision instead of details.

Hight score on Conscientiousness.
- People with scores like this tend to be responsible, persevering, organized, disciplined, and determined. At the workplace, others may see you as a highly focused, well-organized planner who strives for high achievement and is refining and improving continually.

High score on Extraversion.
- People with scores like this tend to be sociable, talkative, assertive, energetic, active, adventurous, and spunky. At the workplace, others may see you as energetic, active person who prefers working with others.

High score on Agreeableness.
- People with scores like this tend to be cooperative, trusting, good-natured, accommodating, unselfish, Compassionate, and polite. At the workplace, others may see you as humble, interested in others' needs, conflit-avoidant, and pleasant.

Low score on Negative Emotionality.

[FEEDBACK]

FIG. 22

Candidate Detail View                                              ✗

11/13

February 23, 2015
VIP Report Summary for: Ben Smithers
Email: bsmithers@email.com
Position: Lawyer
Culture: Employees

206

[ Print Full Report ]

[ Print Fit Analysis ]

Overall Fit
- Position & Culture: [ Strong ]
- Lawyer: [ Good ]
- Employees Culture: [ Very Strong ]

Position Fit Detail
- Position Interests Fit: [ Very Strong ]
- Position Values Fit: [ Weak ]

Culture Fit Detail
- Employees Culture Fit: [ Very Strong ]

VIP Detail Report
Appendix: Values, Interests, and
Cultural Values Definitions Return to Menu

| Fit By Category | Fit Analysis | Interview Questions |

214    216

215

Opinion:
Ben Smithers is a Very Strong match for the position in terms of *Interests*.

Ben's profile exhibits high scores in the *Enterprising* category, which help characterize successful and happy incumbents in similar positions.

However, Ben does not score highly on the Investigative or Artistic categories, which help characterize successful and happy incumbents.

Uncharacteristic of most successful and happy incumbents in similar positions, Ben's interests profile includes high scores in the *Realistic*, *Social*, and *Conventional* categories. Without the opportunity to incorporate activities satisfying these characteristics, either in the position or personal life, Ben many not be completely happy in the position.

FIG. 23

Candidate Detail View

February 23, 2015
VIP Report Summary for: Ben Smithers
Email: bsmithers@email.com
Position: Lawyer
Culture: Employees

Overall Fit

Position & Culture: [Strong]

Lawyer: [Good]

Employees Culture: [Very Strong]

Position Fit Detail

Position Interests Fit: [Very Strong]

Position Values Fit: [Weak]

Culture Fit Detail

Employees Culture Fit: [Very Strong]

VIP Detail Report

Appendix: Values, Interests, and
Cultural Values Definitions

Return to Menu

---

| Fit By Category | Fit Analysis | Interview Questions |

Potential Interview Questions: 217  216

Use these questions to help determine if Ben would be a good fit for your position opening. In some cases, a question will have more than one option. These options will be displayed as follows:

[*option A* / *option B* / *option C*]

In these cases, select the option which is most appropriate for the position opening you are filling.

Exploring Shared Interests

Enterprising: This job offers multiple opportunities to [*persuade others* / *start new projects* / *make decisions that lead to change*]. What is it about that type of work that is appealing to you? And why?

Enterprising: This job offers multiple opportunities to [*persuade others* / *start new projects* / *make decisions that lead to change*]. What are some jobs or hobbies you've had in the past that place similar demands on you? What did you enjoy or not enjoy about these activities?

Clarifying Missing Interests

Investigative: This job often requires you to [*do research to solve a problem* / *use logic or reasoning to solve a problem*]. Can you think of a role you've had in the past that is similar? Tell me about the role and tell me about why you found that interesting or appealing.

Investigative: Tell me about a role you've had in the past where you had to [*do research to solve a problem* / *use logic or reasoning to solve a problem*]. What steps did you take to ensure you were successful? How did you feel about the work?

Artistic: This job often requires you to [*do something creative* / *work without clear guidelines*]. Can you think of a role you've had in the past that is similar? Tell me about the role and tell me about why you found that interesting or appealing.

Artistic: Tell me about a role you've had in the past where you had to [*do something creative* / *work without clear guidelines*]. What steps did you Print Full Report Print Fit Analysis

COMPUTER IMPLEMENTED METHOD FOR PERSONAL ATTRIBUTE VALUATION AND MATCHING WITH OCCUPATIONS AND ORGANIZATIONS

This United States Non-Provisional Patent Applications claims the benefit of U.S. Provisional Patent Application No. 61/947,301, filed Mar. 3, 2014, hereby incorporated by reference herein.

I. BACKGROUND

Conventional methodologies of assessing person to occupation fit may rely on correlations which lack a meaningful measure to quantify the relationship between the person and the occupation in a manner unaffected by the form of the relationship linear or non-linear, as well as other confounding factors which affect the correlation value as described by Goodwin, L. D., & Leech, N. L. in: Understanding correlation: Factors that affect the size of r. *Journal of Experimental Education*, 2006, 74, 251-266, and many of the problems with simple correlations between profiles as discussed by Edwards, J. R. Person-job fit: A conceptual integration, literature review, and methodological critique. In C. L. Cooper & I. T. Robertson (Eds.), *International review of industrial and organizational psychology*, 1991, vol. 6, pp. 283-357, New York: Wiley.

II. SUMMARY OF THE INVENTION

Accordingly, a broad object of embodiments of the invention can be to provide a computer implemented system and method for personal attribute valuation and fit of a user to one or more occupations. The system takes the form of computer elements and computer code which function to allow a user to assess user values and user interests relevant to an occupation and transforms the assessed user values and user interests to corresponding user values scores and user interest scores. The computer code further functions to compare the user values scores and user interests scores to standardized occupation values scores and occupation interests scores for a plurality of occupations retrievably stored in a server computer. The computer code includes a scoring algorithm which functions to calculate a user-occupation fit score (a congruence index) which provides an objective measure of user to occupation fit by comparing user values scores and user interests scores with derived standardized (ideal) occupation values scores and occupation interest scores for one or a plurality of occupations. The user-occupation fit score provides a meaningful fit measure which quantifies the suitability of a user in relation to a plurality of occupations.

Another broad object of embodiments of the invention can be to provide a computer implemented system and method for personal attribute valuation and fit of a user to one or more organizations. The system takes the form of computer elements and computer code which function to allow a user or an organization to assess user values, user interests, and user workplace preferences relevant to an occupation or an organization and transforms the assessed user values, user interests, and user workplace preferences to corresponding user values scores, user interest scores, and user workplace preferences scores. The computer code further functions to compare the user work values scores, user interests scores, and workplace preferences scores to organization values scores, organization interest scores, and organization workplace preferences scores retrievably stored in a server computer. The computer code includes a scoring algorithm which functions to calculate a user-organization fit score (a congruence index) which provides an objective measure of user to organization fit by comparing user values scores, user interests scores, and user workplace preferences scores with derived standardized (ideal) organization values scores, organization interest scores, and organization workplace preferences scores for one or a plurality of organizations. The user-organization fit score provides a meaningful fit measure which quantifies the suitability of a user in relation to one or more occupations.

Naturally, further objects of the invention are disclosed throughout other areas of the specification, drawings, photographs, and claims.

III. A BRIEF DESCRIPTION OF THE DRAWINGS

FIG. 4 is an illustration of a particular embodiment of an interactive graphical user interface image including a values assessment instruction which by click event allows execution of the program code to further display a values assessment instrument.

FIG. 5 is an illustration of a particular embodiment of an interactive graphical user interface image including a values assessment instrument.

FIG. 7 is an illustration of a particular embodiment of an interactive graphical user interface image including an interests assessment instruction which by click event allows execution of the program code to further display a interests assessment instrument.

FIG. 10 is an illustration of a particular embodiment of an interactive graphical user interface image including a personality assessment instruction which by click event allows execution of the program code to further display a personality assessment instrument.

FIG. 13 is an illustration of a particular embodiment of an interactive graphical user interface image including a workplace preferences assessment instruction which by click event allows execution of the program code to further display a workplace preferences assessment instrument.

FIG. 16 is an illustration of a particular embodiment of an interactive graphical user interface image including an occupation fit filter display area and an occupation fit display area which by click event activates occupation fit filters and initiates an occupation data retrieval request to retrieve one or more occupation identifiers based on user occupation fit scores.

FIG. 17A is an illustration of a particular embodiment of an interactive graphical user interface image which includes alternative occupation titles.

FIG. 17B is an illustration of a particular embodiment of an interactive graphical user interface image which includes a description of an occupation.

FIG. 18 is an illustration of a particular embodiment of an interactive graphical user interface image which by click event allows weighted use of both user-occupation fit and user-organization fit metrics in comparing a plurality of users against one or a plurality of occupations.

FIG. 20 is an illustration of a user fit profile retrieved by click event of user identifiers in the graphical user interface shown in FIG. 19.

FIG. 22 is an illustration of a graphical user interface image which by click event displays a detailed fit analysis comparing how occupation scores compare to user scores of the user chosen for an occupation.

FIG. 23 is an illustration of a graphical user interface image which by click event displays a interview questions based on the occupation and user scores.

IV. DETAILED DESCRIPTION OF THE PREFERRED EMBODIMENTS

Figure 1:
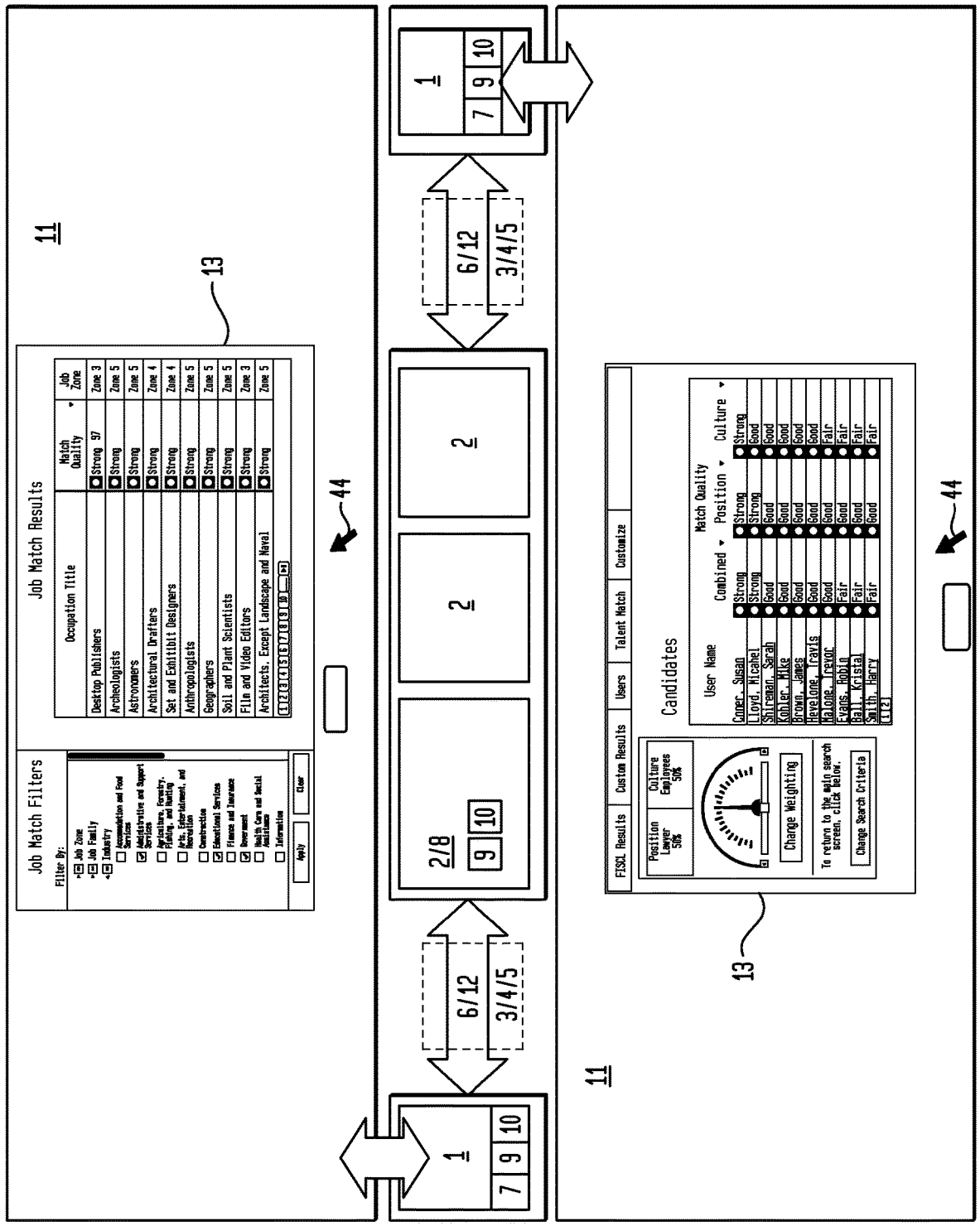
FIG. 1 is a block diagram of a particular embodiment of an inventive computer implemented system for personal attribute valuation and fit with occupations and organizations.
Figure 2:
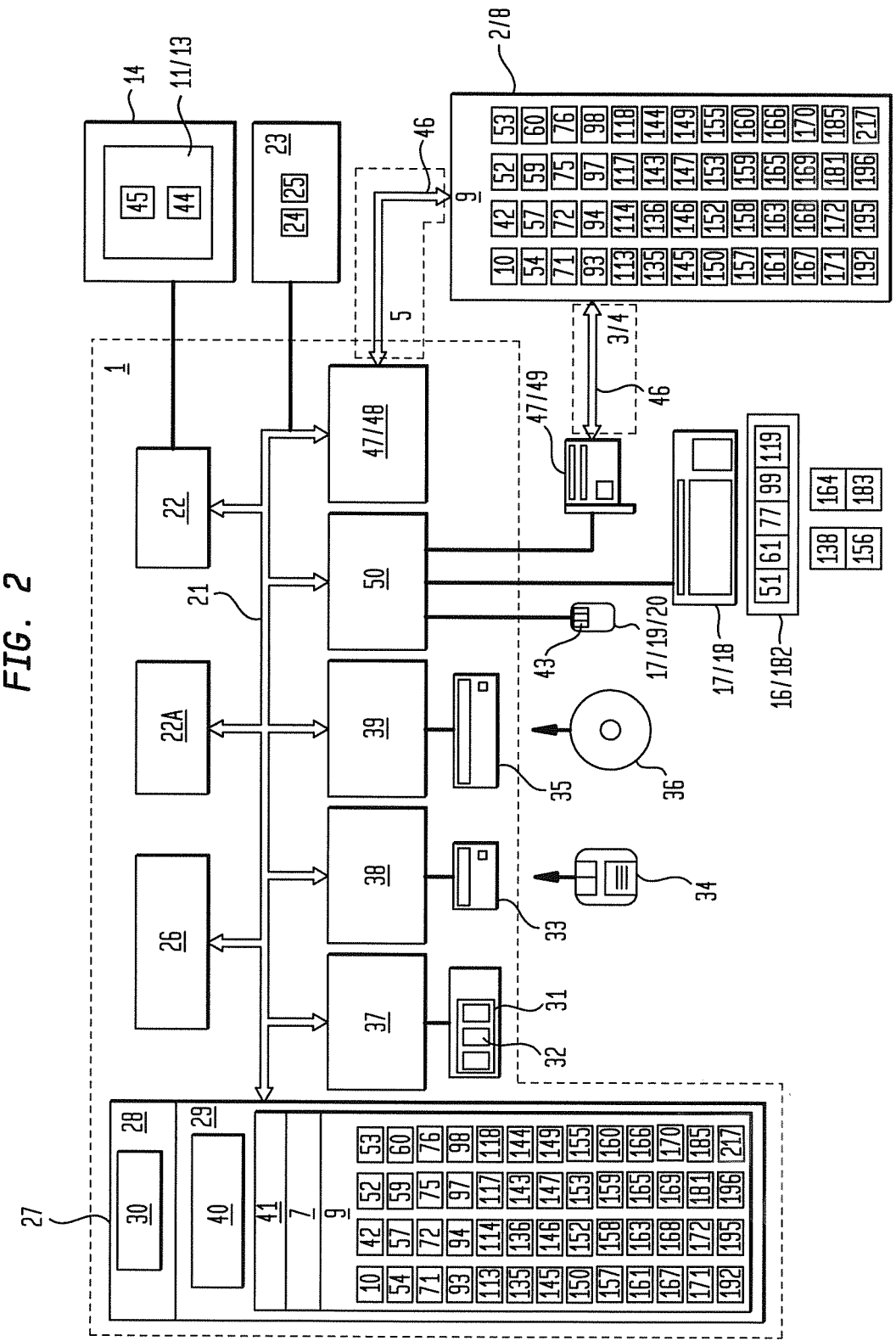
FIG. 2 is a block diagram of an illustrative computer elements, network elements and computer-readable medium which provides computer-executable instructions to provide embodiments of the inventive computer implemented system for personal attribute valuation and fit with occupations and organizations.

Now referring to primarily to FIGS. 1 and 2, one or more client devices (1) can be configured to connect with one or more server computers (2) through a wide area network ("WAN") (3), such as the Internet (4), or one or more local area networks (5) ("LAN") to transfer digital data (6). As to particular embodiments, the one or more client devices (1) can take the form of a limited-capability computer designed specifically for navigation on a WAN (3) such as the Internet (4). Alternatively, the one or more client devices (1) might be set-top boxes, intelligent televisions connected to receive digital data (6) through an entertainment medium such as a cable television network or a digital satellite broadcast, hand-held devices such as smart phones, slate or pad computers, personal digital assistants or camera/cell phone, or multiprocessor systems, microprocessor-based or programmable consumer electronics, network personal computers, minicomputers, mainframe computers, or the like, or a combination thereof.

Again referring primarily to FIGS. 1 and 2, in general, each of the one or more client devices (1) can include a browser (7) such as Microsoft's INTERNET EXPLORER®, GOOGLE CHROME®, MOZILLA FIREFOX®, or the like, which functions to download and render multimedia content that is formatted in "hypertext markup language" (HTML). In this environment, a first server computer (8) can include an computer code (9) which in part includes a "personal attribute valuation and matching program" containing a graphical user interface module (10) executable to implement the most significant portions of a graphical user interface (11). As to these embodiments, the graphical user interface module (10) which implements the graphical user interface (11) can be resident in the first server computer (8)(as shown in the examples of FIGS. 1 and 2) and the one or more client devices (1) can use the browser (7) to simply display downloaded content and to relay user inputs (12) back to the first server computer (8). The first server computer (8) would respond by formatting new graphical user interface images (13) (as shown in the illustrative examples of FIGS. 3 through 21) and downloading graphical user interface images (13) for display on the display surface (14) associated with the one or more of the client devices (1).

In other embodiments, the one or more server computers (1) can be used primarily as sources of digital data (6), with primary responsibility for implementing the graphical user interface (11) placed upon each of the client devices (1). As to these embodiments, each of the one or more client devices (1) can store or run the computer code (9) implementing the graphical user interface (11) and retrieve digital data (6) from the one more server computers (2). While illustrative examples in this description may attribute a certain type of digital data (6) to a certain server computer (2) for clarity, it is to be understood that various types of digital data (6) may reside in one server computer (2) or one type of digital data (6) can be distributed among a plurality of server computers (2) and embodiments of the invention can utilize a lesser or greater number of server computers (2) to a lesser or greater extent depending upon the application. The computer code (9) further operates to provide digital data (6) obtained from one or more server computers (2) in a common format, as further described below.

A user (16) can enter commands and information into one or more client devices (1) through input devices (17) such as a keyboard (18) or a pointing device (19) such as a mouse (20); however, any method or device that converts user (16) action into commands and information can be utilized including, but not limited to: a microphone, joystick, game pad, touch screen, or the like. The display surface (14) such as a monitor screen or other type of display device can also be connected to a bus (21) via a video display interface (22), such as a video adapter, or the like. The graphical user interface (11) can in part be presented as one or more interactive graphical user interface images (13) on the display surface (14). In addition to the display surface (14), each of the one or more client devices (1) can further include other peripheral output devices (23) such as speakers (24) and printers (25), or the like, or combinations thereof.

Now referring primarily to FIG. 2, an illustrative example of a client device (1) includes a processing unit (26), a memory element (27), and a bus (21) which operably couples components of the client device (1), including without limitation the memory element (27) to the processing unit (26). The processing unit (26) can comprise one central-processing unit (CPU), or a plurality of processing units which operate in parallel to process digital information. The bus (21) may be any of several types of bus configurations including a memory bus or memory controller, a peripheral bus, and a local bus using any of a variety of bus architectures. The memory element (27) can without limitation be one or more of a read only memory (ROM) (28) or a random access memory (RAM) (29), or a combination thereof. A basic input/output system (BIOS) (30), containing routines that assist transfer of data between the components of the client device (1), such as during start-up, can be stored in ROM (28). The client/computer (1) can further include a hard disk drive (31) for reading from and writing to a hard disk (32), a magnetic disk drive (33) for reading from or writing to a removable magnetic disk (34), and an optical disk drive (35) for reading from or writing to a removable optical disk (36) such as a CD ROM or other optical media. The hard disk drive (31), magnetic disk drive (33), and optical disk drive (35) can be connected to the bus (21) by a hard disk drive interface (37), a magnetic disk drive interface (38), and an optical disk drive interface (39), respectively. The memory element (27) or the drives (37) (38)(39) and their associated computer-readable media (32) (34)(36) provide nonvolatile storage of computer-readable instructions, data structures, program modules and other digital data (15) for the client device (1). It can be appreciated by those skilled in the art that any type of computer-readable media that can store data that is accessible by a computer, such as magnetic cassettes, flash memory cards, digital video disks, Bernoulli cartridges, random access memories (RAMS), read only memories (ROMs), and the like, may be used in a variety of operating environments. The computer code (9) whether in part, as to particular computer program modules, or in whole may be stored on or included in the hard disk drive (33), magnetic disk (34), optical disk (36), ROM (28), or RAM (29), including an operating system (40), one or a plurality of application programs (41) including the inventive personal attribute valuation and matching program (42) which implements the graphical user interface (11) or other program interfaces.

A "click event" occurs when the user (16) operates a function of the computer code (9) through the use of a command which for example can include pressing or releasing a left mouse button (43) while a pointer (44) is located over a control icon (45) (or other interactive field which activates a function of the computer code (9)) displayed in a graphical user interface image (13) of the graphical user interface (11). However, it is not intended that a "click event" be limited to the press and release of the left button (43) on a mouse (20) while a pointer (44) is located over a control icon (45) (or field), rather, a "click event" is intend to broadly encompass a command by the user (16) through which a function of computer code (9)(whether one or more of a program, an application, a module, or the like) including that portion of the computer code (9) which implements the graphical user interface (11) can be activated or performed whether through selection of one of a plurality of control icon(s) (45) or fields, or by user voice command, keyboard stroke, mouse button, touch on a touch screen, or otherwise. It is further intended that control icons (45) can be configured or displayed in any configuration such as a bullet, a point, a circle, a triangle, a square, a polygon (or other geometric configurations or combinations thereof), or as fields or boundary elements created in graphical user interface images (13), or as fields in which locations, addresses, or other terms can be entered manually or by operation of the computer code (9), or a portion or element thereof, such as: a street address, a zip code, a county code, a natural area code, a latitude/longitude, projected coordinate X and Y, or other notation, script, character, or the like.

The client computer (1) may operate in a networked environment using one or more logical connections (46) to connect to one or more of server computers (2). These logical connections (46) can be achieved by one or more communication devices (47) coupled to or a part of the client device (1); the invention is not limited to a particular type of communications device (47). The one or more server computers (2) can be another computer, a server, a router, a network PC, a client, a peer device or other common network node, and can include a part or all of the elements above-described relative to the client device (1). The logical connections (46) depicted in FIG. 2 can include a LAN (5) or a WAN (4). Such networking environments are commonplace and include for example: enterprise-wide computer networks, intranets, wireless networks, global satellite networks, cellular phone networks and the Internet (4), or the like.

When used in a LAN-networking environment, the client device (31) can be connected to the LAN (5) through a network interface (48) or adapter, which is one type of communications device (47). When used in a WAN-networking environment, the client device (1) typically includes a modem (49), a type of communications device (47), or other type of communications device for establishing communications over the WAN (3), such as the Internet (4)(as shown in the example of FIGS. 1 and 2). The modem (49), which may be internal or external, is connected to the bus (21) via a serial port interface (50). In a networked environment, program modules depicted relative to the client device (1), or portions thereof, may be as to certain embodiments of the invention be stored in the one or more server computers (2) (as shown in the examples of FIGS. 1 and 2). It is appreciated that the network connections shown are exemplary and other elements of and communications devices for establishing a communications link between the client devices (1) and the server computers (2) can be used.

Again referring primarily to FIGS. 1 and 2, the client device (1) can encompass a single client computer or can encompass a plurality of client devices each of which can be operated by a user (16). The user (16) can access the computer code (9) including the personal attribute valuation and matching program (42) containing the graphical user interface module (10) that implements the graphical user interface (11) allowing retrieval of digital data (6) from one or more server computers (2) in a common format for display in or as a part of the graphical user interface (11) on the display surface (14) of the client device (1).

Now referring to FIGS. 3 through 21, which provide illustrative exemplary embodiments of the apparatus and method inventive graphical user interface (11) including one or more graphical user interface images (13) generated by the graphical user interface module (10). The graphical user interface (11) can be implemented using various technologies and different devices, depending on the preferences of the designer and the particular efficiencies desired for a given circumstance.

Now referring primarily to FIGS. 1 through 15, a user (16) can use the browser (7) of a client device (1) to download the computer code (9) in whole or in part including the inventive personal attribute valuation and matching program (42) from a server computer (2) to the memory element (27) of the client device (1). A processor (26) in communication with the memory element (27) of the client device (1) can execute the relevant portions of the computer code (9) to display an interactive graphical user interface (11) including one or more interactive graphical user interface images (13) which can be serially presented on the display surface (14) associated with the client device (1). The user (16) by click event in the one or more interactive graphical user interface images (13) can relay user inputs (12) back to the server computer (2) or client device (1). The client device (1) or server computer (2) can respond by formatting additional interactive graphical user interface images (13) for display on the display surface (14) of the client device (1).

Embodiments of the interactive graphical user interface images (13) can by click event be used to execute the inventive personal attribute valuation and matching program (42) of the program code (9) to assess one or more user attributes (51) of the user (16) which by further execution of the computer code (9) can be transformed into user attribute scores (52) which by comparison to occupation attribute scores (53) allows calculation of corresponding occupation-user fit scores (54) for the assessed one or more user attributes (51) of the user (16).

Figure 3:
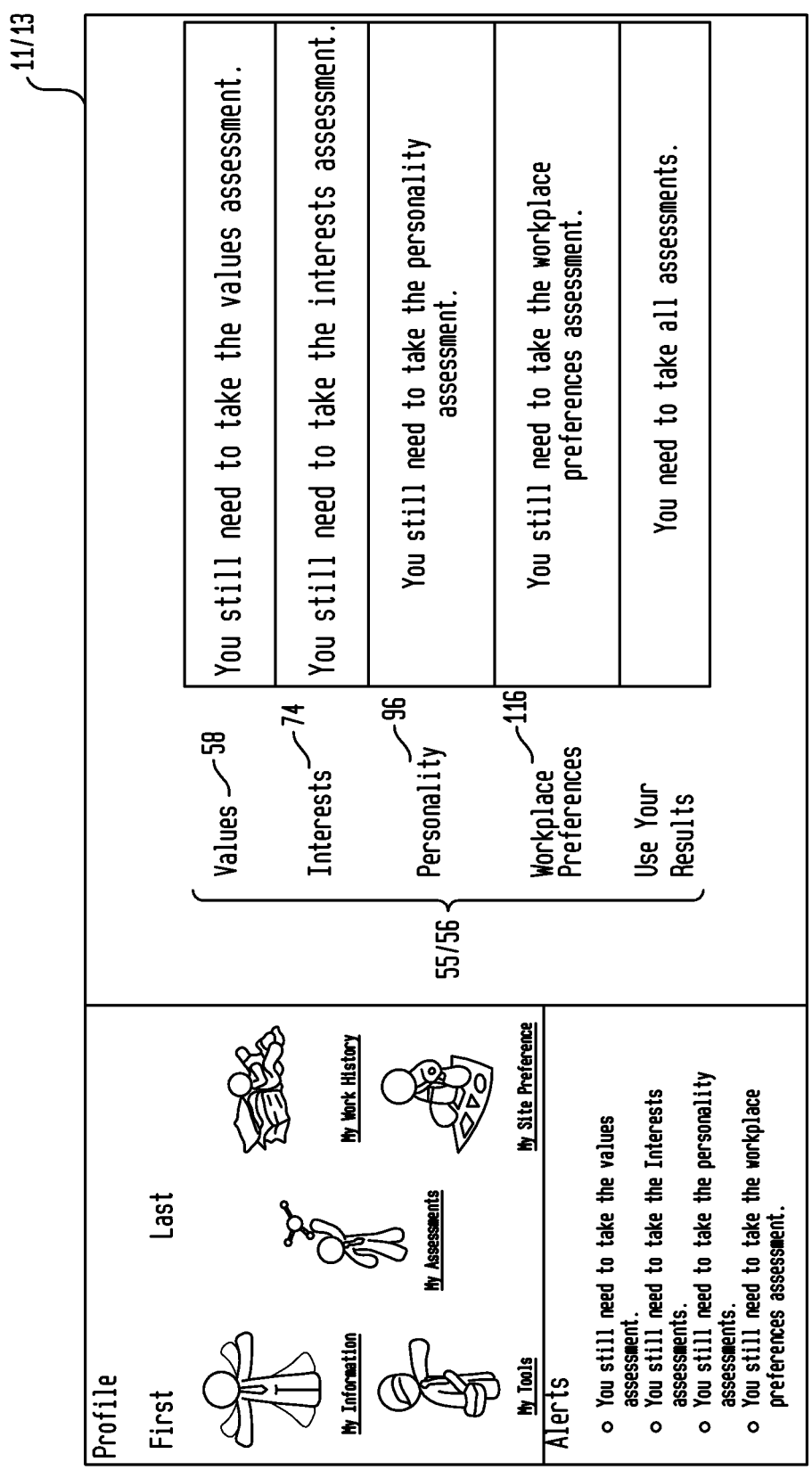
FIG. 3 is an illustration of particular embodiment of an interactive graphic user interface including an interactive graphical user interface image which displays a plurality of user attribute category icons which by click event retrieve instructions and user attribute assessment instruments.

Now referring primarily to FIG. 3, an illustrative example of the interactive graphical user interface (11) is shown which includes one or more user attribute category icons (55) corresponding to one more user attribute categories (56)(as shown in the example of FIG. 3 "Values", "Interests", "Personality" and "Workplace Preferences"). A user attribute category icon (55) can by click event execute the program code (9) to retrieve one or more user attribute assessment instruments (57) stored in a server computer (2). The user attribute assessment instruments (57) can be used to measure the corresponding user attribute (51) of the selected user attribute category (56).

Figure 6:
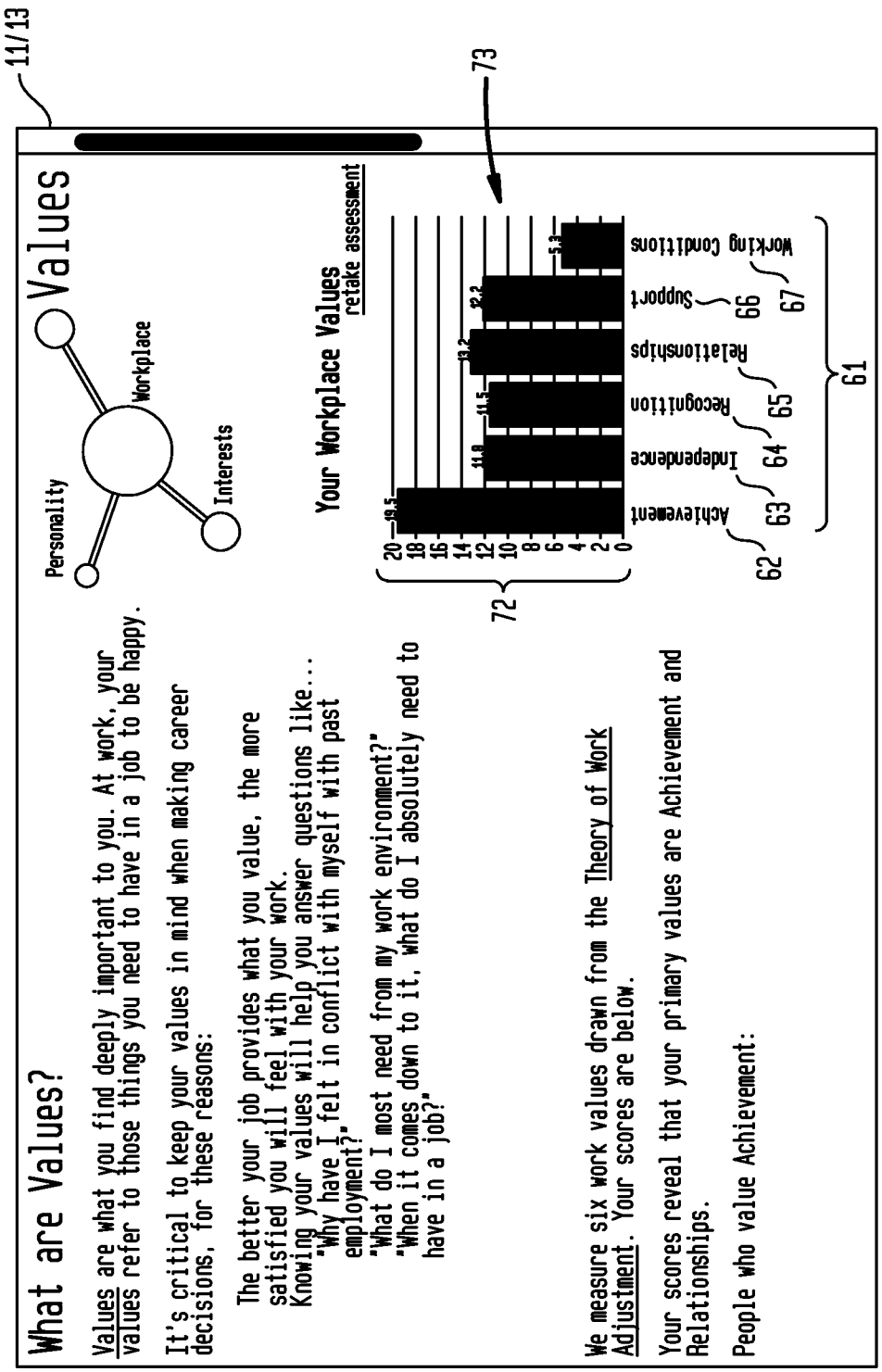
FIG. 6 is an illustration of a particular embodiment of an interactive graphical user interface image including a user values scores graph which plots calculated user value scores for assessed user values.

For example, by click event of a values category icon (58) (one of the user attribute category icons (55)), the program code (9) can be executed to display a values assessment instruction (59) (as shown in the example of FIG. 4) which allows execution of the program code (9) by click event to retrieve and display a values assessment instrument (60). The values assessment instrument (60) accessible by the user (16) as one or more interactive graphical user interface images (13) allows assessment of user values (61) relevant to an occupation (138) (as shown in the example of FIG. 5). A values assessment instrument (60) suitable for use with embodiments of the invention can be an O*NET Work Importance Locator published by the United States Department of Labor Employment and Training Administration, hereby incorporated by reference, which measures six user values (61) drawn from "The Theory of Work Adjustment," Dawis and Lofquist in: *A psychological theory of work adjustment*. Minneapolis: University of Minnesota Press, 1984, hereby incorporated by reference ("Achievement" (62), "Independence" (63), "Recognition" (64), "Relationships" (65), "Support" (66), and "Working Conditions" (67), as shown in the example of FIG. 6). The values assessment instrument (60) can be configured to operate by click event to allow the user (16) to place in priority order one or more value statements (68). The embodiment of the graphical user interface (11) shown in the example of FIG. 5 allows use of a pointer (44) to drag and drop the value statements (68) into priority order from top to bottom in a list of value statements (69).

The user (16) by click event of a values submission icon (70) can submit the completed values assessment instrument (60) to activate a values score value calculator (71) which functions to transform the user values (61) assessed by use of the values assessment instrument (60) into user values scores (72) for each of the six user values (61). The computer code (9) can further function to generate a user values scores graph (73) which allows ready comparison of each of the calculated user value scores (72) for the six user values (61)(as shown in the example of FIG. 6 as a bar graph which plots each of the user values scores (72) for "Achievement" (62), "Independence" (63), "Recognition" (64), "Relationships" (65), "Support" (66), and "Working Conditions" (67).

Figure 8:
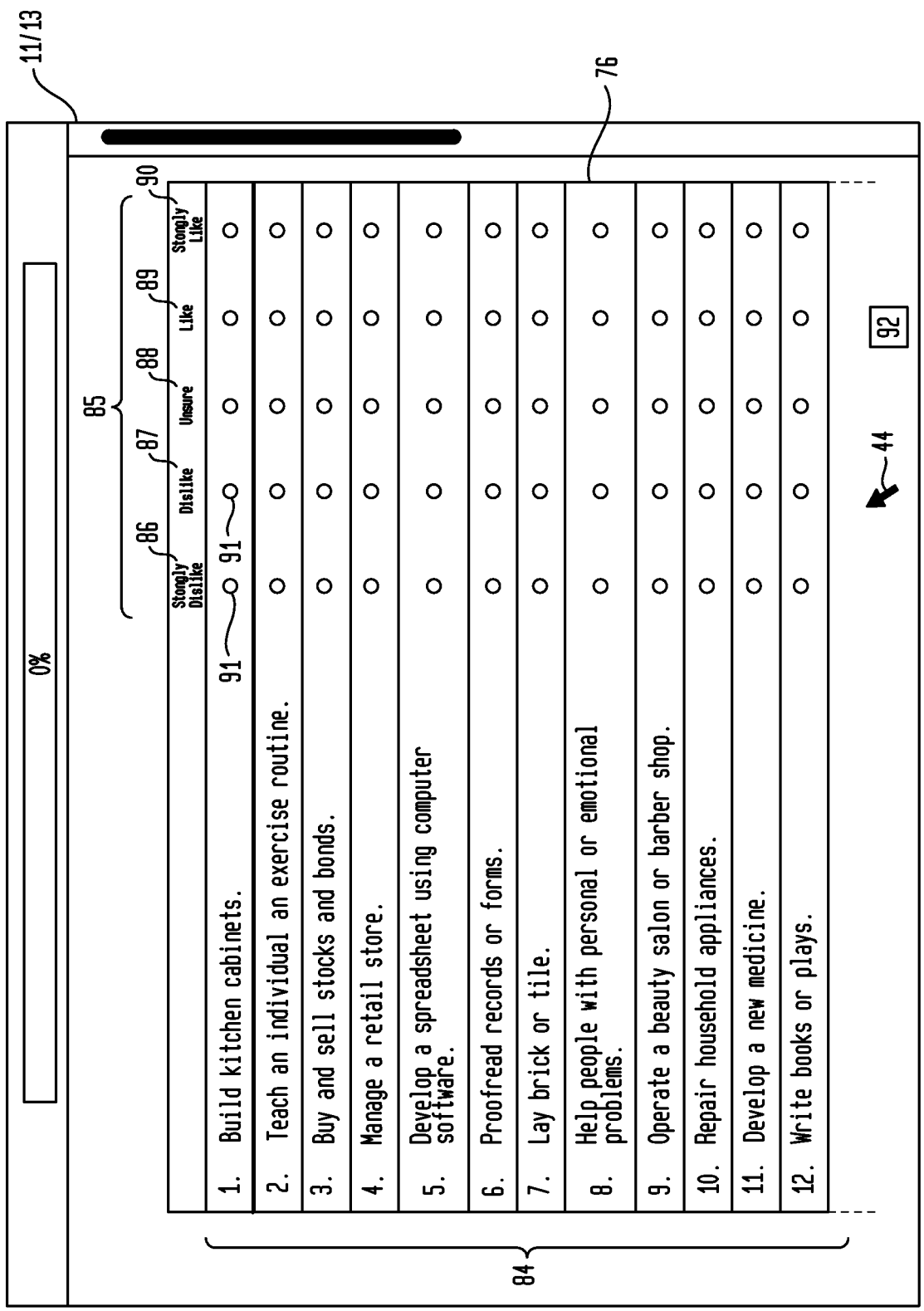
FIG. 8 is an illustration of a particular embodiment of an interactive graphical user interface image including an interests assessment instrument.

Again referring primarily to FIG. 3, the user (16) by click event of an interests category icon (74) can execute the program code (9) to display an interest assessment instruction (75) (as shown in the example of FIG. 7). The user by click event can execute the program code (9) to further retrieve and display an interests assessment instrument (76) from a memory element (27) as one or more interactive graphical user interface images (13) (as shown in the example of FIG. 8). The interests assessment instrument (76) accessible by the user (16) as one or more interactive graphical user interface images (13) allows the assessment of user interests (77) relevant to an occupation (138) (as shown in the example of FIG. 7). An interest assessment instrument (76) suitable for use with embodiments of the invention can be the O*NET Interest Profiler published by the United States Department of Labor Employment and Training Administration, hereby incorporated by reference herein, which measures six user interests (72) drawn from "RIASEC Theory Of Vocational Types," Holland, *Making vocational choices: A theory of vocational personalities and work environments* (3rd ed.). Odessa, Fla.: Psychological Assessment Resources, 1997, hereby incorporated by reference herein ("Realistic" (78), "Investigative" (79), "Artistic" (80), "Social" (81), "Enterprising" (82), and "Conventional" (83)). The interests assessment instrument (76) can be configured to operate by click event to associate each of a plurality of interest statements (84) with one of a plurality interest valuation statements (85)(shown in the example of FIG. 8 as "Strongly Dislike" (86), "Dislike" (87), "Unsure" (88), "Like" (89). or "Strongly Like" (90)). The embodiment of the graphical user interface (11) shown in the example of FIG. 8 allows use of a pointer (44) to selectably darken a bullet (91) associated with one of the listed interest valuation statements (80).

Figure 9:
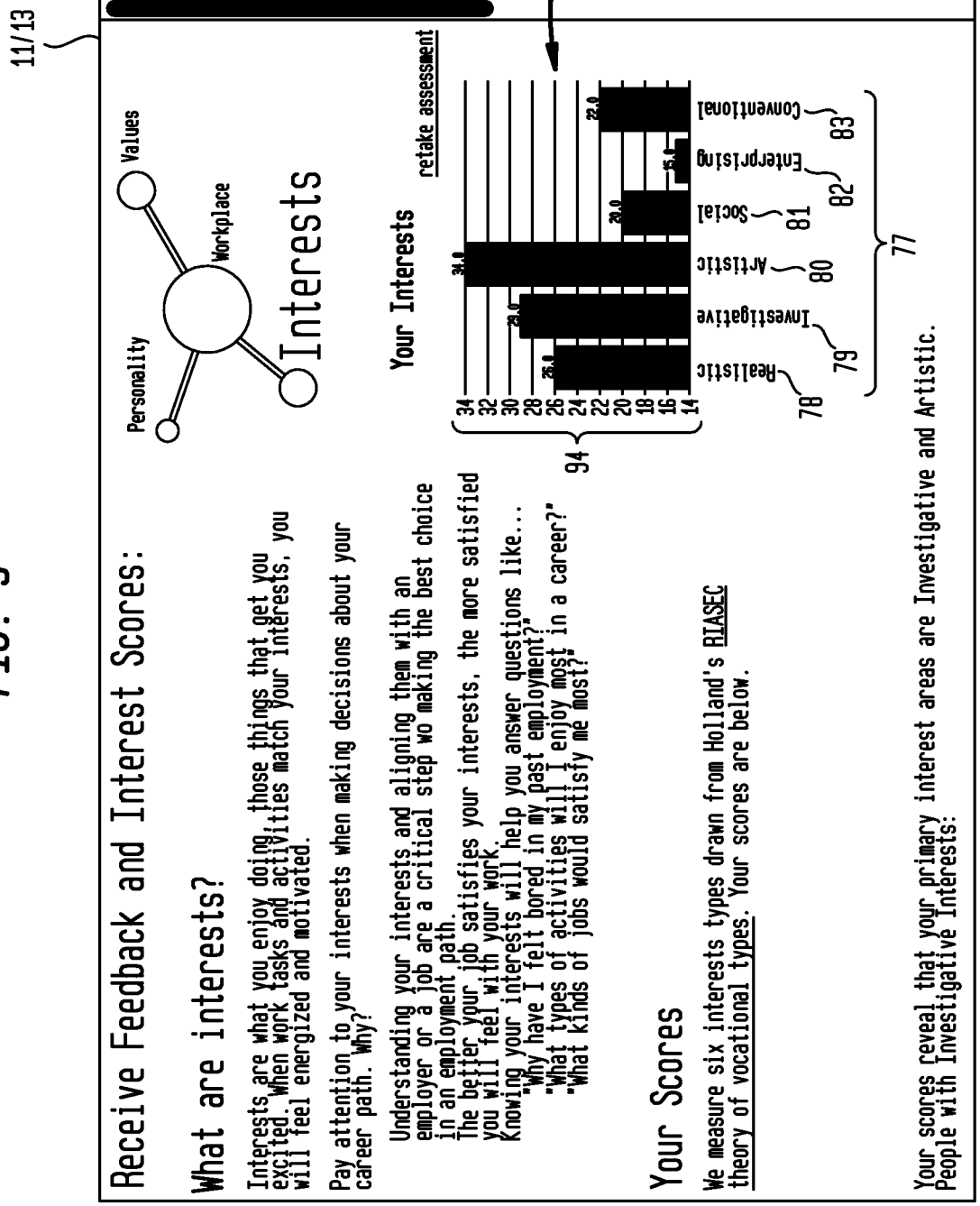
FIG. 9 is an illustration of a particular embodiment of an interactive graphical user interface image including a user interest scores graph which plots calculated user interest scores for assessed user interests.

The user (16) by click event of an interest submission icon (92) can submit the completed interests assessment instrument (76) to activate an interest score calculator (93) which functions to transform the user interests (77) assessed by use of the interests assessment instrument (76) into each of the user interest scores (94) for each of the user interests (72). As to particular embodiments, the interest score calculator (93) operates to generate user interest scores (94) for each of the six user interests (77) ("Realistic" (78), "Investigative" (79), "Artistic" (80), "Social" (81), "Enterprising" (82), and "Conventional" (83)). The computer code (9) can further function to generate a user interests scores graph (95) which allows ready comparison of user interests scores (94) for each of the calculated user interests (77)(as shown in the example of FIG. 9 as a bar graph which plots each of the user assessment interests scores (89) for "Realistic" (78), "Investigative" (79), "Artistic" (80), "Social" (81), "Enterprising" (82), and "Conventional" (83)).

Again referring primarily to FIG. 3, by click event of a personality category icon (96), the program code (9) can be executed to display a personality assessment instruction (92)

Figure 11:
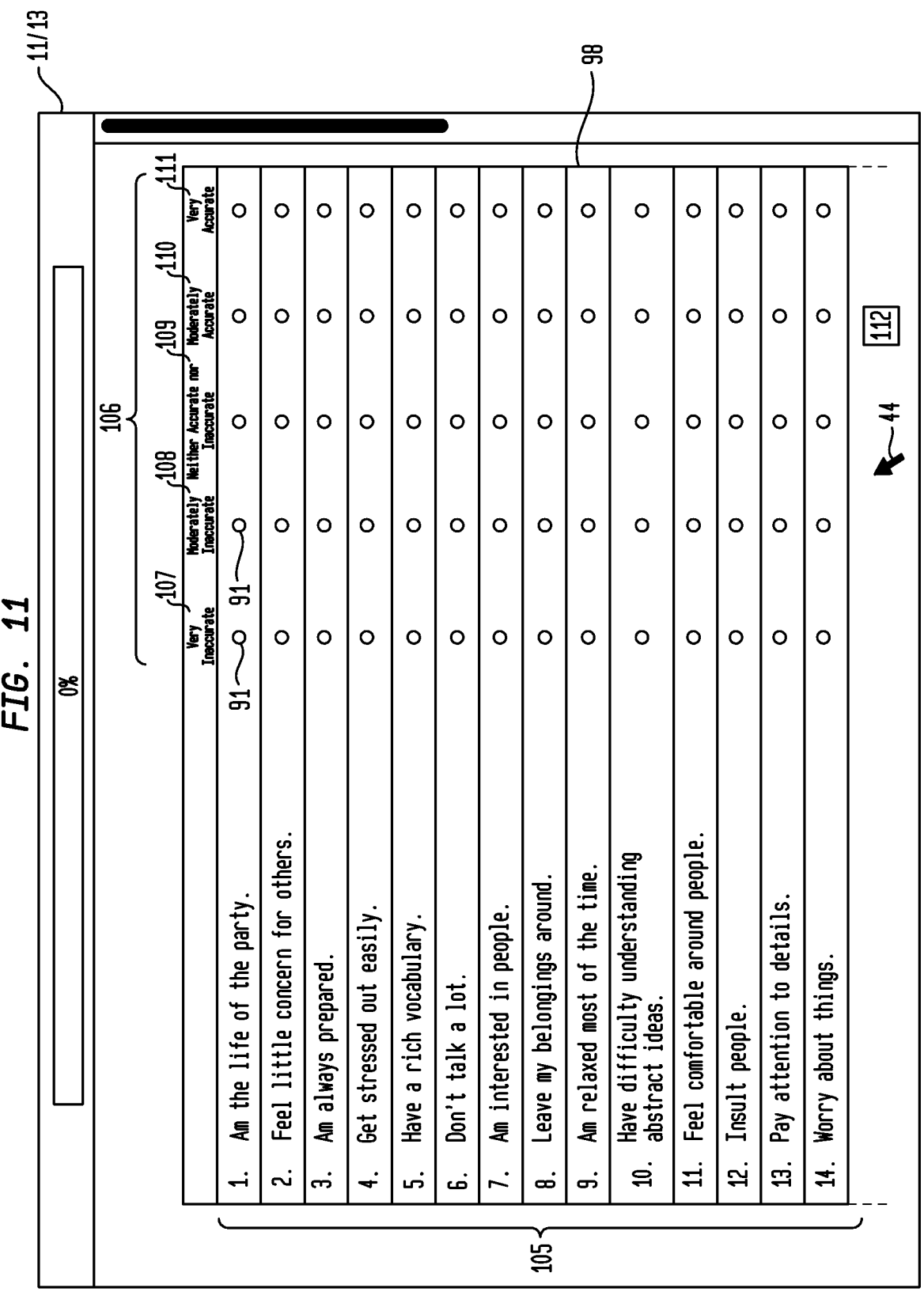
FIG. 11 is an illustration of a particular embodiment of an interactive graphical user interface image including a personality assessment instrument.

(as shown in the example of FIG. 10) which allows execution of the program code (9) by click event to retrieve and display a personality assessment instrument (98) as an interactive graphical user interface images (13) (as shown in the example of FIG. 11). The personality assessment instrument (98) accessible by the user (16) as one or more interactive graphical user interface images (13) allows the assessment of user personality characteristics (99) relevant to an occupation (138) (as shown in the example of FIG. 11). A personality assessment instrument (98) suitable for use with embodiments of the invention can be the "Questionnaire Format for Administering the 50-Item Set of IPIP Big-Five Factor Markers" published by Goldberg, 1992, hereby incorporated by reference, which measures five user personality characteristics (99) (shown in the example of FIG. 12 as "Openness to Experience" (100), "Conscientiousness" (101), "Extraversion" (102), "Agreeableness" (103) and "Negative Emotionality" (104)). The personality assessment instrument (98) can be configured to operate by click event to associate each of a list of personality statements (105) with one of a list of personality valuation statements (106) (as shown in the example of FIG. 11 as "Very Inaccurate" (107), "Moderately Accurate" (108), "Neither Accurate nor Inaccurate" (109), "Moderately Accurate" (110), or "Very Accurate" (111)). The embodiment of the graphical user interface (11) shown in the example of FIG. 11 allows use of a pointer (44) to selectably darken a bullet (91) associated with one of the listed personality valuation statements (106).

Figure 12:
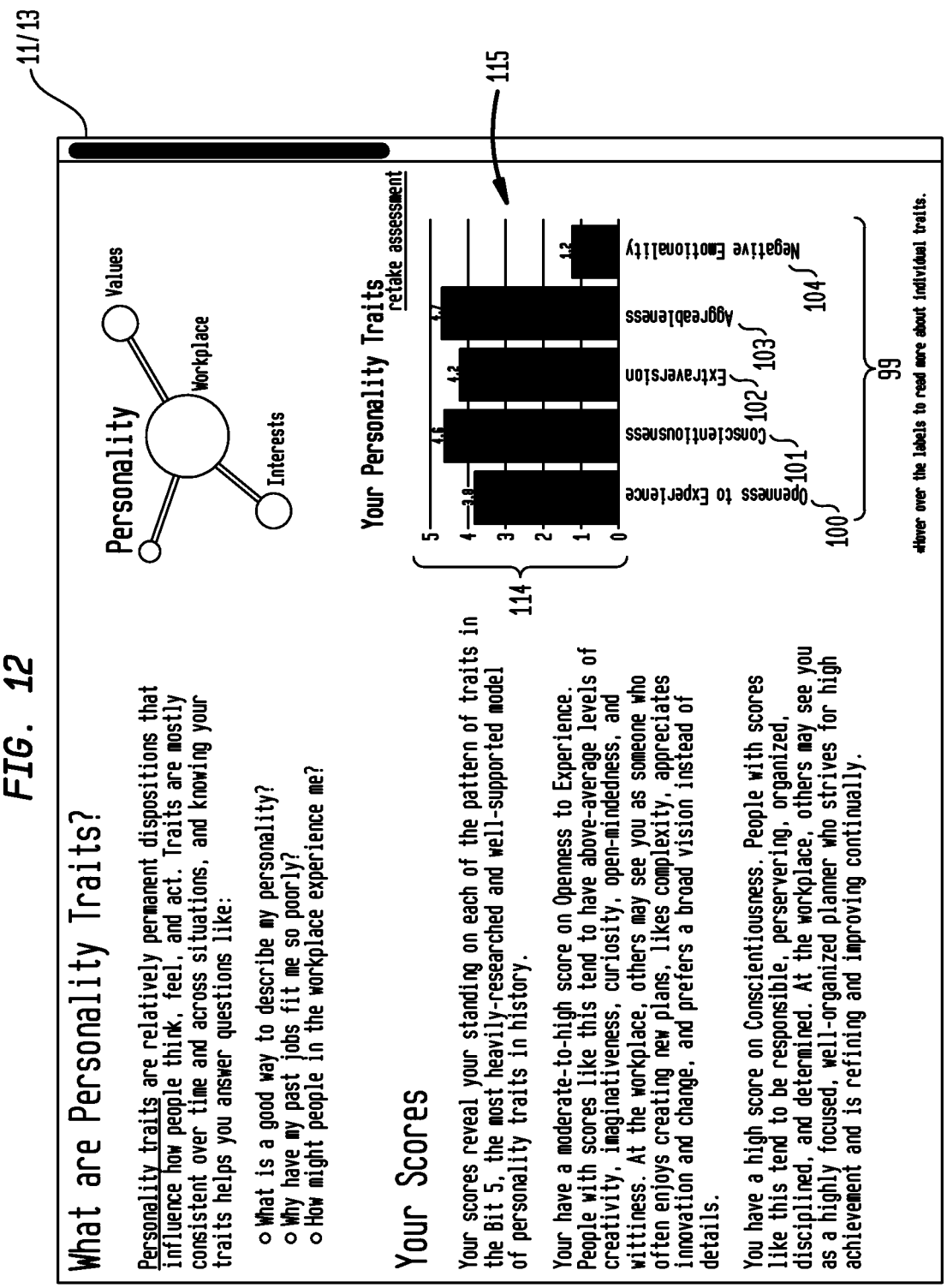
FIG. 12 is an illustration of a particular embodiment of an interactive graphical user interface image including a user personality scores graph which plots calculated user personality scores for assessed user personality characteristics.

The user (16) by click event of a personality assessment submission icon (112) can submit the completed personality assessment instrument (98) to activate a personality score calculator (113) which functions to transform the user personality characteristics (99) assessed by use of the personality assessment instrument (98) in to user personality scores (114) for each of the user personality characteristics (94). As to particular embodiments, the personality score calculator (113) operates to generate user personality scores (114) for each of the five user personality characteristics (99) ("Openness to Experience" (100), "Conscientiousness" (101), "Extraversion" (102), "Agreeableness" (103) and "Negative Emotionality" (104)). The computer code (9) can further function to generate a user personality characteristics scores graph (115) which allows ready comparison of each of the calculated user personality characteristics (99) (as shown in the example of FIG. 12 as a bar graph which plots each of the user personality scores (114) for "Openness to Experience" (100), "Conscientiousness" (101), "Extraversion" (102), "Agreeableness" (103) and "Negative Emotionality" (104)).

Figure 14:
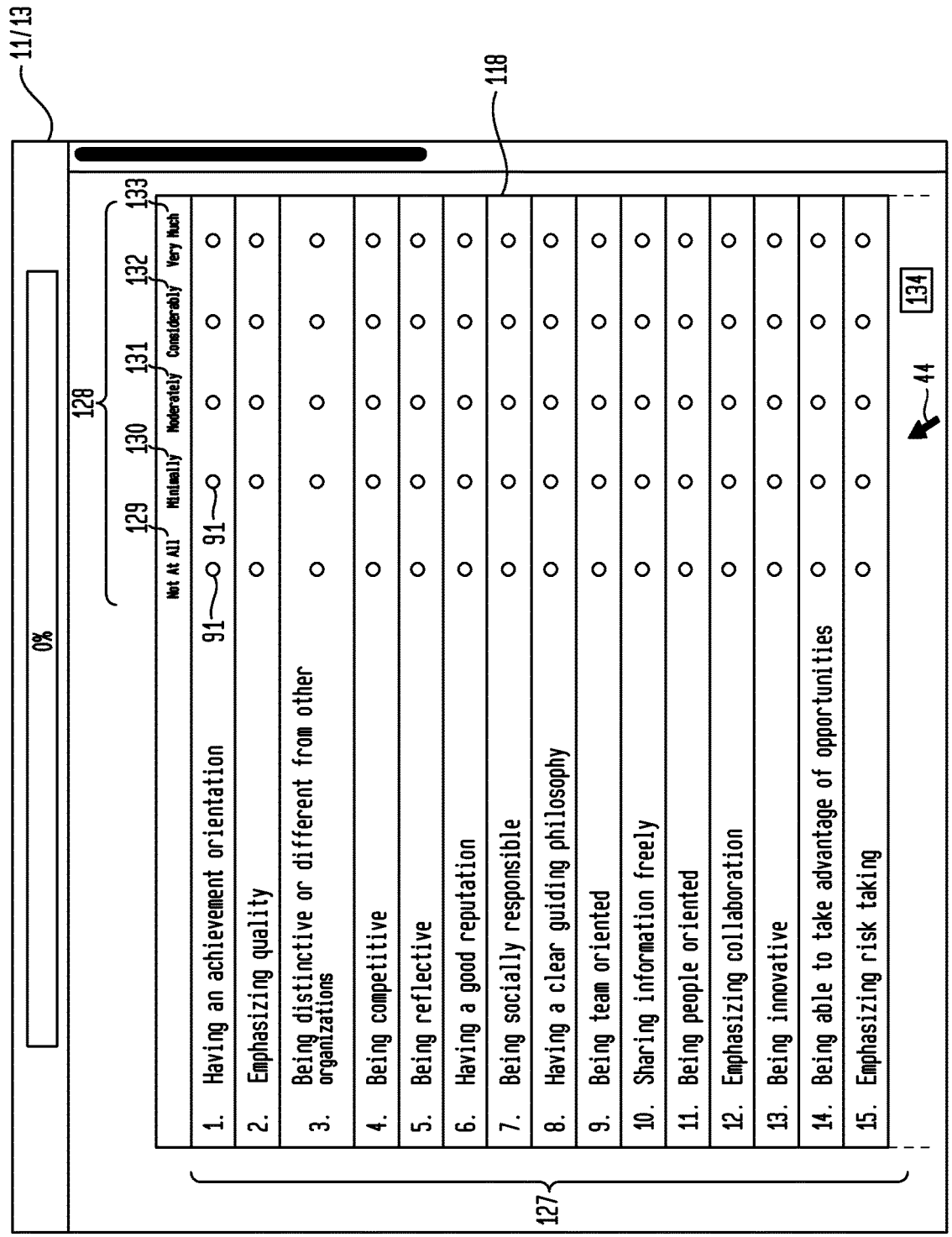
FIG. 14 is an illustration of a particular embodiment of an interactive graphical user interface image including a workplace preferences assessment instrument.

Again referring primarily to FIG. 3, by click event of a workplace preferences category icon (116), the program code (9) can be executed to display a workplace preferences assessment instruction (117) (as shown in the example of FIG. 13) which allows execution of the program code (9) by click event to retrieve and display a workplace preferences assessment instrument (118) as one or more interactive graphical user interface images (13) (as shown in the example of FIG. 14). The workplace preferences assessment instrument (118) accessible by the user (16) as one or more interactive graphical user interface images (13) allows the assessment of user workplace preferences (119) relevant to an occupation (138) or an organization (173)(as shown in the example of FIG. 14). A workplace preferences assessment instrument (118) suitable for use with embodiments of the invention can be the Organizational Culture Profile-Revised published by Sarros, Gray, Densten, and Cooper in: The Organizational Culture Profile Revisited and Revised: An Australian Perspective. *Australian Journal of Management*, 2005, 30, 159, hereby incorporated by reference herein, which measures six user workplace preferences (119) (shown in the example of FIG. 15 as "Competiveness" (119), "Social Responsibility" (120), "Supportiveness" (121), "Innovation" (122), Emphasis on Rewards" (123), "Performance Orientation" (124), and "Stability" (125)). The workplace assessment instrument (119) can be configured to operate by click event to associate each of a plurality of work place preference statements (127) with one of a list of work place preference valuation statements (128) (shown in the example of FIG. 14 as "Not At All" (129), "Minimally" (130), "Moderately" (131), "Considerably" (132), or "Very Much" (133)). The embodiment of the graphical user interface (11) shown in the example of FIG. 14 allows use of a pointer (44) to selectably darken a bullet (91) associated with one of the listed workplace preference valuation statements (127).

Figure 15:
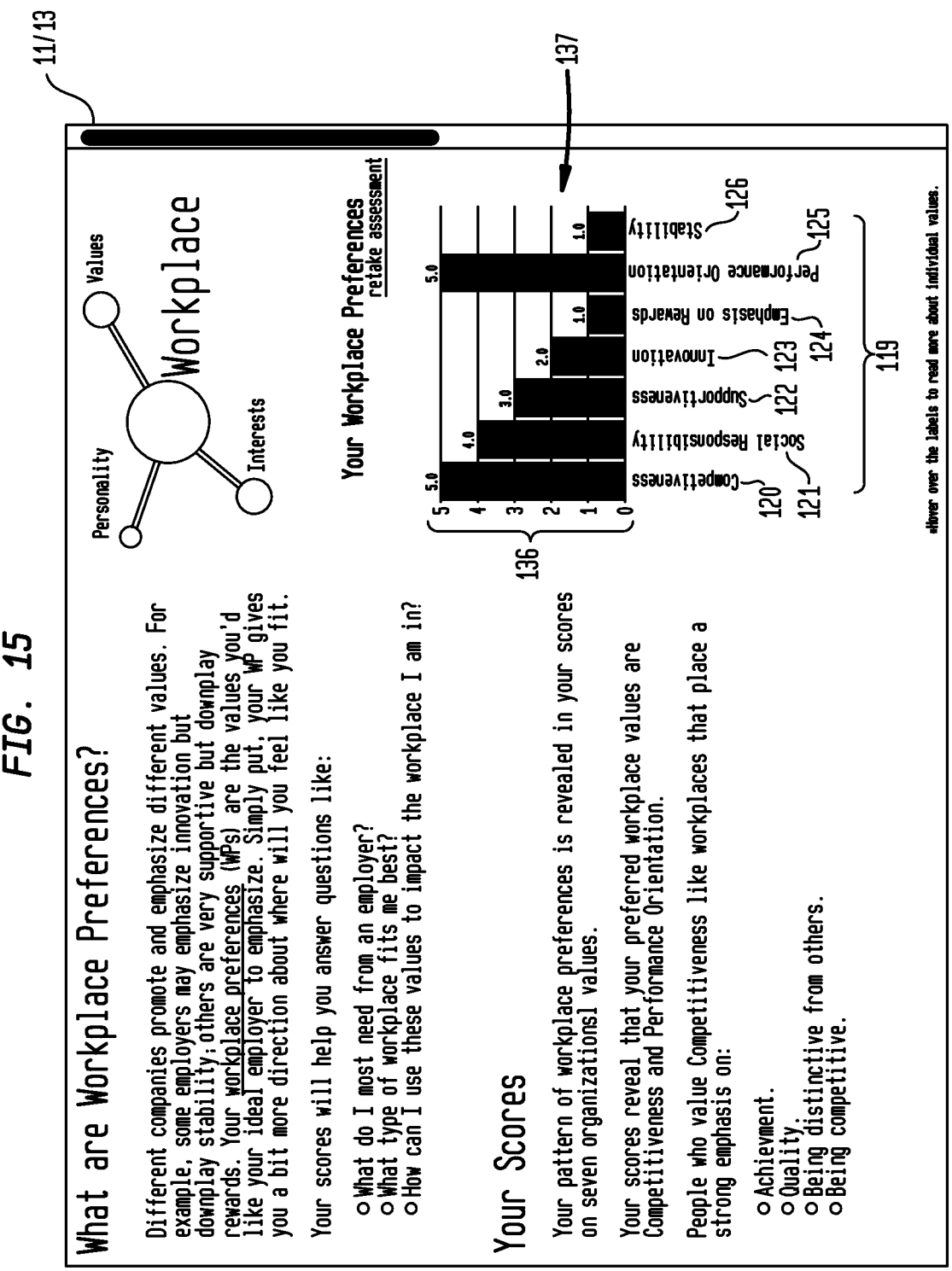
FIG. 15 is an illustration of a particular embodiment of an interactive graphical user interface image including a user workplace preferences scores graph which plots calculated user workplace preference scores for assessed user workplace preferences.

The user (16) by click event of a workplace preferences assessment submission icon (134) can submit the completed workplace preferences assessment instrument (118) to activate a workplace preferences score calculator (135) which functions to transform the user workplace preferences (119) assessed by use of the workplace preferences assessment instrument (118) into user workplace preferences scores (136) for each of the six user workplace preferences (119). As to particular embodiments, the workplace preferences score calculator (135) operates to generate user workplace preferences scores (136) for each of the six workplace preferences (119) "Competiveness" (120), "Social Responsibility" (121), "Supportiveness" (122), "Innovation" (123), Emphasis on Rewards" (124), "Performance Orientation" (125), and "Stability" (126). The computer code (9) can further function to generate a user workplace preferences scores graph (137) which allows ready comparison of each of the calculated user workplace preferences (119)(as shown in the example of FIG. 15 as a bar graph which plots each of the user workplace preferences scores (136) for "Competiveness" (120), "Social Responsibility" (121), "Supportiveness" (122), "Innovation" (123), Emphasis on Rewards" (124), "Performance Orientation" (125), and "Stability" (126).

Now referring primarily to FIG. 16, the program code (9) can be further executed to concurrently display in the interactive graphical user interface (11) an occupation fit filter display area (139) and an occupation fit display area (140). The program code (9) can further operate to display in the occupation fit filter display area (139) a plurality of occupation fit filter icons (141).

In the particular embodiment shown, the occupation fit filter icons (141) include an occupation zone filter icon (142) which by click event executes an occupation zone filter (143) which removes or inserts search control elements (144) in association with an occupation data retrieval request (145) which limit retrieval of occupation data (146) having a corresponding occupation zone identifier (147) associated with occupations (138) inside of a bounded geographic area.

Similarly, in the particular embodiment shown, the occupation fit filter icons (141) include an occupation family filter icon (148) which by click event executes an occupation family filter (149) which removes or inserts search control elements (144) in association with an occupation data retrieval request (145) to limit retrieval of occupation data (146) to that including a corresponding occupation family identifiers (150) which typically defines a series of progressively higher, related occupations (138) distinguished by levels of knowledge, skills, and abilities (competencies) and other factors.

Similarly, in the particular embodiment shown, the occupation fit filter icons (141) include an occupation industry filter icon (151) which by click event executes an occupation industry filter (152) which removes or inserts search control elements (144) in association with an occupation data retrieval request (145) to limit retrieval of occupation data (146) to that including a corresponding industry identifiers (153) which defines occupations (138) related to a particular a group of businesses that provide a particular product or service.

The program code (9) can be further executed to concurrently display an occupation data retrieval request icon (154) in the graphical user interface (11) which by click event initiates an occupation data retrieval request (145) limited by the occupation fit filters (143)(149)(152) (or other filters) to retrieve occupation data (146) stored in a server computer (2)(shown in the example of FIG. 16 as "Apply").

Now referring primarily to FIGS. 1 and 2, embodiments of the program code (9) further include a user-occupation matching module (155) activated upon initiation of an occupation data retrieval request (145). The user-occupation matching module (155) when evaluating the occupation fit (156) (also referred to as "($F_p$)") of an user (16) to a particular occupation (138), the user attribute category scores (52) for user values (61) ("V") and user interests (77) ("I") are considered for a user (16) ("x") and an occupation (138) ("y'). Occupation fit (156) ($F_p$) is provided as numerical occupational fit score (157) in the scale of between 0 to 1, with 0 equating to no occupational fit (156), and 1 equating to a perfect occupational fit (156). Occupational fit (156) ($F_p$) can be calculated by the user-occupational matching module (155) by application of the following equation:

$$F_p = (\tfrac{2}{3}\eta_I^{xy})(\tfrac{1}{3}\eta_V^{xy})$$

Where $\eta_I^{xy}$ (referred to as "an interests fit score (158)") and $\eta_V^{xy}$ (referred to as "a values fit score (159)") are each determined by application of $$\eta_i^{xy} \equiv \sqrt{\frac{\Sigma_i N_i (\bar{y}_i - \bar{y})^2}{\Sigma_i \Sigma_a (y_{ia} - \bar{y})^2}}$$

Where $\Sigma$ means "sum of"; and

Where $N_i$ is the number of observations of $_i$th phenomenon, where $_i = 1, \ldots, p$ in this application $N_i = 2$ because there is one set of scores for the user x and one set of scores for the occupation (see the example of Table 5); and Where $\bar{y}_i$ is the average of user interests scores (94) and the corresponding occupation interest scores (160) for each of the calculated user interests (77): "Realistic" (78), "Investigative" (79), "Artistic" (80), "Social" (81), "Enterprising" (82), and "Conventional" (83). For example, if the user interest score (94) for "Realistic" (78) is 4.0 and the corresponding occupation interest score (160) for "Realistic" (78) is 6.0, then $\bar{y}_i = 5.0$, that is, [(4.0+6.0)/2]=5.0; or Where $\bar{y}_i$ is the average of user value scores (72) and the corresponding occupation values scores (161) for each of the calculated user values (72): "Achievement" (62), "Independence" (63), "Recognition" (64), "Relationships" (65), "Support" (66), and "Working Conditions" (67). For example, if the user value score (72) for "Achievement" (62) is 4.0 and the corresponding occupation value score (161) for "Achievement" (62) is 6.0, then $\bar{y}_i = 5.0$, that is, [(4.0+6.0)/2]=5.0; or Where $\bar{y}_i$ is the average of user workplace preferences scores (136) and the corresponding organization workplace preferences scores (136) for each of the calculated user workplace preferences scores (136): "Competiveness" (120), "Social Responsibility" (121), "Supportiveness" (122), "Innovation" (123), Emphasis on Rewards" (124), "Performance Orientation" (125), and "Stability" (126). Again, if the user workplace preference score (136) for "Competiveness" (120) is 4.0 and the corresponding organization workplace preference score (163) for "Competiveness" (120) is 6.0, then $\bar{y}_i = 5.0$, that is, [(4.0+6.0)/2]=5.0; and Where $y_{i\alpha}$ refers to the number of entities scored (user (16), occupation (138), organization (164) or the like) for a category (interests (77), values (61) or workplace preferences (119), or the like) ("$_i$") and the number of scored attributes (51) within a category ("$_\alpha$"). For example, for the category interests (77) "$_i$" applies to user interest scores (94) plus the occupation interest scores (160), or user interest scores (94) plus the organization interest scores (217), that is "$_i$" equals 2. $\alpha$ applies to the scored user interests (77): "Realistic" (78), "Investigative" (79), "Artistic" (80), "Social" (81), "Enterprising" (82), and "Conventional" (83), that is, $_\alpha$ equals six.

As to particular embodiments the plurality of occupations (138) and corresponding occupation data (146) can include and correspond to the O*NET OnLine Occupations whether by keyword or O*NET-SOC Code, hereby incorporated by reference herein.

As an illustrative example, the occupation fit (156) determination commences when the user (16) submits the values assessment instrument (60) or the an interests assessment instrument (76) by use of the interactive graphical user interface (11) including one or more interactive graphical user interface images (13), as above described, at which point, a set of correlation ratios ($\eta_i^{xy}$) (165) are generated comparing the user values scores (72) and the user interest scores (94) to the corresponding occupation values score (161) and the occupation interest scores (160) associated with one or more occupations (138) retrievably stored in the computer server (2). As to particular embodiments, the occupation values score (161) and occupation interest score (160) can be the O*NET OnLine Occupations value and interests scores, hereby incorporated by reference herein.

In order to generate each one of the set of correlation ratios (165) to compare the user values scores (72) and the user interest scores (94) to the corresponding occupation values score (161) and the occupation interest scores (160) associated with one or a plurality of occupations (138), the a user-occupation matching module (155) functions to retrieve the occupation values scores (161) and occupation interest scores (160) from the server computer (2).

As one illustrative example, the occupation values scores (161) and occupation interest scores (160) can be retrieved for the occupation (138) of Dental Assistant. The occupation values scores (161) and occupation interest scores (160) for the occupation (138) of Dental Assistant are set out in Table 1.

TABLE 1

| Values | | Interests | |
| --- | --- | --- | --- |
| Psychological Category Name | Occupation Data Value - Raw | Psychological Category Name | Occupation Data Value - Raw |
| Achievement | 3.330000 | Realistic | 5.670000 |
| Work Conditions | 4.170000 | Investigative | 3.330000 |
| Recognition | 3.000000 | Artistic | 1.330000 |
| Relationships | 6.000000 | Social | 4.670000 |
| Support | 5.670000 | Enterprising | 2.670000 |
| Independence | 3.670000 | Conventional | 6.000000 |

The user-occupation matching module (155) then functions to retrieve the user values scores (72) and user interest assessment scores (94) from the server computer (2). The user values scores (72) and user interest scores (94) are set out in Table 2.

TABLE 2

| Values | | Interests | |
|---|---|---|---|
| Psychological Category Name | Candidate Data Value - Raw | Psychological Category Name | Candidate Data Value - Raw |
| Achievement | 18.000000 | Realistic | 29.000000 |
| Work Conditions | 10.000000 | Investigative | 33.000000 |
| Recognition | 6.750000 | Artistic | 32.000000 |
| Relationships | 8.170000 | Social | 8.000000 |
| Support | 9.830000 | Enterprising | 13.000000 |
| Independence | 19.830000 | Conventional | 24.000000 |

As to particular embodiments, the occupation values scores (161) and occupation interest scores (160) (such as the O*NET values and interests scores) may utilize different scales or the user values scores (72) or the user interests scores (94) may use different scales. Accordingly, the user-occupation matching module (155) can further function to transform the data to provide a common scale (166) between the scores. As to the embodiment shown in the Figures, the user-occupation matching module (155) converts occupation interest scores (160) and occupation values scores (161) and user interests scores (72) and user values scores (94) to a common scale (166) (such as a ten point scale) through use of the following equation:

$$\frac{\text{raw score}}{\text{scoring scale maximum}} = \frac{\text{transformed score}}{\text{10 point scale}}$$

As such, each occupation score (160)(161) is multiplied by 10, and then divided by maximum score obtainable on the common scale (166). This data transformation yields normalized occupation values scores (167) and normalized occupation interests scores (168) for the occupation (138) of Dental Assistant and normalized user values scores (169) and normalized user interests scores (170), as shown in Table 3.

TABLE 3

| | Values | | Interests | | |
|---|---|---|---|---|---|
| Psychological Category Name | Occupation Data Value - Normalized | User Data Value - Normalized | Psychological Category Name | Occupation Data Value - Normalized | User Data Value - Normalized |
| Achievement | 4.757143 | 8.571429 | Realistic | 8.100000 | 7.250000 |
| Work Conditions | 5.957143 | 4.761905 | Investigative | 4.757143 | 8.250000 |
| Recognition | 4.285714 | 3.214286 | Artistic | 1.900000 | 8.000000 |
| Relationships | 8.571429 | 3.890476 | Social | 6.671429 | 2.000000 |
| Support | 8.100000 | 4.680952 | Enterprising | 3.814286 | 3.250000 |
| Independence | 5.242857 | 9.442857 | Conventional | 8.571429 | 6.000000 |

Following score transformation, the user-occupation matching module (155) further functions to calculate the set of correlation ratios ($\eta_{i^{yy}}$) (165), as above described, for each assessment and retrievably stores the set of correlation ratios (165) in the server computer (2). Regardless of the data sets being examined, the process for calculating a correlation ratio takes the same form.

For example, in the case of the user values scores (72) for the user values (61) of "Achievement" (62), "Independence" (63), "Recognition" (64), "Relationships" (65), "Support" (66), and "Working Conditions" (67), as above described, the following measures can be computed:

An overall mean, $\bar{y}$, representing the average of all the user values scores (72) for user values (61) being compared; and A set of categorical means, each denoted as $\bar{y}_i$ with i serving as an equation place holder for the specific category, which are the averages of the occupation values scores (161) and the user values scores (72) for each category (such as the average of "Achievement" (62)), as above described.

For the example of the occupation value scores (161) for Dental Assistant and the user values scores (72), the exemplary measures are set forth in Table 4.

TABLE 4

| | Values | | | |
|---|---|---|---|---|
| Psychological Category Name | Occupation Data Value - Normalized | User Data Value - Normalized | Occupation & User Average Data Value By Category ($\bar{y}_i$) | Occupation & User Average Data Value Overall ($\bar{y}$) |
| Achievement | 4.757143 | 8.571429 | 6.664286 | 5.956349 |
| Work Conditions | 5.957143 | 4.761905 | 5.359524 | |

TABLE 4-continued

| | Values | | | |
|---|---|---|---|---|
| Psychological Category Name | Occupation Data Value - Normalized | User Data Value - Normalized | Occupation & User Average Data Value By Category ($\bar{y}_i$) | Occupation & User Average Data Value Overall ($\bar{y}$) |
| Recognition | 4.285714 | 3.214286 | 3.750000 | |
| Relationships | 8.571429 | 3.890476 | 6.230952 | |
| Support | 8.100000 | 4.680952 | 6.390476 | |
| Independence | 5.242857 | 9.442857 | 7.342857 | |

These values are then used in the following equation:

$$\eta_i^{xy} \equiv \sqrt{\frac{\Sigma_i N_i (\bar{y}_i - \bar{y})^2}{\Sigma_i \Sigma_a (y_{ia} - \bar{y})^2}}$$

In general, this equation examines the squared difference between the categorical means as they relate to the overall mean, and the squared difference of each individual score as it relates to the overall mean. The square root of the resulting ratio (categorical vs overall over individual vs overall) can be used to describe the degree of similarity between the user values scores (72) and occupation values scores (161) with 0 indicating no similarity, and 1 indicating a perfect match. These calculations for the exemplary user (16) and the exemplary occupation (138) of Dental Assistant are set out in Table 5.

to determine a user-occupation fit score (157) ($F_p$) of 0.618692 for the above illustrative example.

The equation for ($F_p$) can further include and the user-occupation matching module (155) can be further executed to apply an interests score allocation factor (171) within a range of 0 to 1 to the interests fit score (158) ($\eta_i^{xy}$) and allows application of a values score allocation factor (172) within a range of 0 to 1 to the values fit score (159) ($\eta_i^{xy}$), wherein the interests score allocation factor (171) and the values score allocation factor (172) when summed equal 1. In the illustrative example above, an interest scores allocation factor (171) equal to about ⅔ was applied to the interests fit score (158) and a values allocation factor (172) equal to about ⅓ was applied to the values fit score (159). Application of an interests scores allocation factor (171) which is greater than ½ and less than ⅚ has been discovered to

TABLE 5

| | Values | | | | |
|---|---|---|---|---|---|
| | Psychological Category Name | $2(\bar{y}_i - \bar{y})^2$ | Numerator - Sum of Categorical Difference Values | $\eta_i xy^2$ - Numerator/ Denominator | $\eta_i xy$ - Square Root of $\eta_i xy^2$ |
| Numerator | Achievement | 1.002348 | 15.823258 | 0.316424 | 0.562516 |
| | Work Conditions | 0.712401 | | | |
| | Recognition | 9.735954 | | | |
| | Relationships | 0.150814 | | | |
| | Support | 0.376932 | | | |
| | Independence | 3.844809 | | | |
| | Psychological Category Name | $(y_{ia} - \bar{y})^2$ Occupation | $(y_{ia} - \bar{y})^2$ User | Denominator - Sum of Individual Score Difference Values | |
| Denominator | Achievement | 1.438096 | 6.838640 | 50.006523 | |
| | Work Conditions | 0.000001 | 1.426698 | | |
| | Recognition | 2.791021 | 7.518912 | | |
| | Relationships | 6.838640 | 4.267831 | | |
| | Support | 4.595239 | 1.626637 | | |
| | Independence | 0.509071 | 12.155738 | | |

The user-occupation matching module (155) further functions to generate a values fit score (159) (for the illustrative example shown above 0.562515) and an interests fit score (158) (for the illustrative example shown above 0.646781) which was derived by the a user-occupation matching module (155) in the same fashion.

The user-occupation matching module (155) can further function to utilize the values fit score (159) and the interests fit score (158) in the equation:

$$F_p = (\tfrac{2}{3}\eta_i^{xy})(\tfrac{1}{3}\eta_i^{xy})$$

generate a user-occupation fit score (157) which is more predictive of actual user-occupation fit (156) than previously known.

Now referring primarily to FIG. 16, as shown in the occupation fit display area (140), the user-occupation matching module (155) can transform the results returned as above-described for display by the graphical user interface module (11) as a list of occupation identifiers (173) in priority order based upon the user-occupation fit score (157).

Each occupation identifier (174) can be associated with an occupation fit score indicator (175) (as shown in the example of FIG. 16 an alpha fit value (176) "Strong" and a color code match values (177) or a numeric match value (178)).

Now referring primarily to FIGS. 17A and 17B, as to particular embodiments, by click event a user (16) can select one of the occupation identifiers (174) to activate the user-occupation matching module (155) to retrieve the occupation data (146) associated with the selected occupation identifier (174) which can include as an illustrative example an "Alternate Job Title List" (179) as shown in the example of FIG. 17A or a description of the occupation (180) as shown in the example of FIG. 17B.

Now referring primarily to FIGS. 1 through 3 and 13 through 15, embodiments of the program code (9) can further include user-organization match module (181) which compares the user workplace preferences scores (136) of a user (16) to organizational workplace preferences scores (163) of an organization (164) (also referred to as "organization culture scores"). Organizational workplace preference scores (163) can be derived from one or plurality of organization users (182) of organization (164) using the interactive graphical user interface (11) as shown in the example of FIGS. 3 and 13 through 15 by click event of the workplace preferences category icon (116) to retrieve and display the workplace preferences assessment instrument (118). The workplace preferences score calculator (135) can then generate the workplace preferences scores (136) for each of a plurality of organizational users (182) or in selected subpopulation of organization users (174) (for example, those organization users (182) in a particular unit of the organization (164) such as marketing, engineering, accounting, or the like, or those organization users (182) in the whole of the organization (164).

The user-organization match module (181) can be executed to calculate user workplace preferences scores (136) of the user (16) ("x") and to calculate organization workplace preferences scores (163 ("y") for each of: "Competiveness" (120), "Social Responsibility" (121), "Supportiveness" (122), "Innovation" (123), Emphasis on Rewards" (124), "Performance Orientation" (125), and "Stability" (126)", as above described, and further calculate workplace preferences correlation ratios (165), as above described, to generate a user-organizational fit score (183) within a 0-1 scale, with 0 equating to no organization fit, and 1 equating to a perfect organization fit through the following equation:

$$F_c = \eta_{Q^{xy}}$$

Now referring primarily to FIG. 18 the program code (9) can be further executed to concurrently display in the graphical user interface (11) one or more of: a user pool display area (184), an occupation display area (185), an organizational culture display area (186), and an occupation-organizational culture weighting display area (187).

The occupation display area (185) can include a list of occupation identifiers (173) each occupation identifier (174) correspondingly matched to occupation values score (161) and occupation interest score (160), as above described. A particular occupation identifier (174) can selected by click event from the list of occupation identifiers (173).

The user pool display area (184) can provide user identifiers or organizational user identifiers (collectively "user identifiers" (188)) corresponding to users (16) or organization users (182) having occupation attribute scores (53) generated by using the one or more attribute assessment instruments (57), as above described. As to particular embodiments, the user identifiers (188) can be subdivided into user identifier groups (189) representing a group of users (16)(182) associated with a group identifier (190) (as shown in the example of FIG. 18 "Applicants", "Employees", "Leaders", "Sales Group" or the like) which can be selected by click event.

The organizational culture display area (186) allows selection by click event of the organization work preferences scores (163) representing all organizational users (182) having organization workplace preferences scores (163) or representing a subpopulation of organizational users (182) associated with an organizational group identifier (190) (for example "Employees", "Leader", "Sales Group"). As to particular embodiments, the organizational culture display area (186) can further include a pre-selected organization scores icon (191) which by click event activates the user-organization match module (181) to compare user workplace preferences scores (136) against pre-selected organization workplace preferences scores (192) to retrieve a list of user identifiers (188) having a user-organization fit score (183) ($F_c$) which most closely approximates the user-organization fit score (183) for the pre-selected organization workplace preferences scores (192). Accordingly, an organization (164) can employ users (16) or retain organization users (182) which align with the desired organization culture rather than the existing organizational culture.

The user-organization match module (181) can be further executed to display an occupation-organization fit weighting display area (187) which includes an occupation-organizational fit allocator (193) which by click event allows weighted use of the metrics obtained by the user-occupation match module (155) and the metrics obtained by the user-organization match module (181). In the example of FIG. 18, the occupation-organization fit allocator (193) takes the form of a slider (194) positionable by click event between 100% user-occupation fit score (157) and 100% user-organizational fit score (183) to select a weight percent between 0% and 100% for each having a sum equal to 100%. An occupation-organizational fit allocator module (195) of the program code (9) can apply selected weighting to the user-occupation fit score (157) and the user-organization fit score (183), obtained as above described, to generate a combined user occupation-organizational fit score (196).

The occupation-organizational fit allocator module (195) can apply the selected weighting to the previously obtained user-occupation fit score (157) and user-organization fit score (183) to generate the combined user occupation-organizational fit score (196) ($F_{pc}$). Weighting is defined by percentage of total fit, with each fit to occupation and fit to organization being able to be weighted at a percent in the range of 0% and 100% such that their sum is equal to 100%. For example, a percent value fit to a position $F_{p^a}$ where a is the weighting for occupation fit, and percent value fit to organizational culture $F_{c^b}$ where b is the weighting for culture, combined fit $F_{p^a c^b}$ is judged on a 0 to 1 scale with 0 equating to no user-organization fit, and 1 equating to a perfect user-organization fit through the following user fit to organization position equation (also referred to as the "fit to position equation):

$$F_{p^a c^b} = \{a(F_p)\} + \{b(F_c)\}$$

As an illustrative example, the user values fit score (0.562515) (as shown in Table 5), and the user interests fit score (0.646781) can be allocated by the occupation-organizational culture weight allocator module (187) by the fit to occupation equation, $F_p = (\frac{2}{3}\eta_{I^{xy}})(\frac{1}{3}\eta_{V^{xy}})$, to determine an user-occupation fit score (162) of 0.618692. This is then combined with the user-organizational fit score (175) 0.422198, which was derived in the same fashion as those for interest and values, through use of the overall fit to occupation and organizational culture equation $F_{p^oc^b} = \{a(F_p)\} + \{b(F_c)\}$ where a and b are the weights assigned to the occupation fit and organization fit respectively. Using a weight of 50% (0.5) for each, the user (16) demonstrates a combined user occupation-organization fit score (196) of 0.520445.

Figure 19:
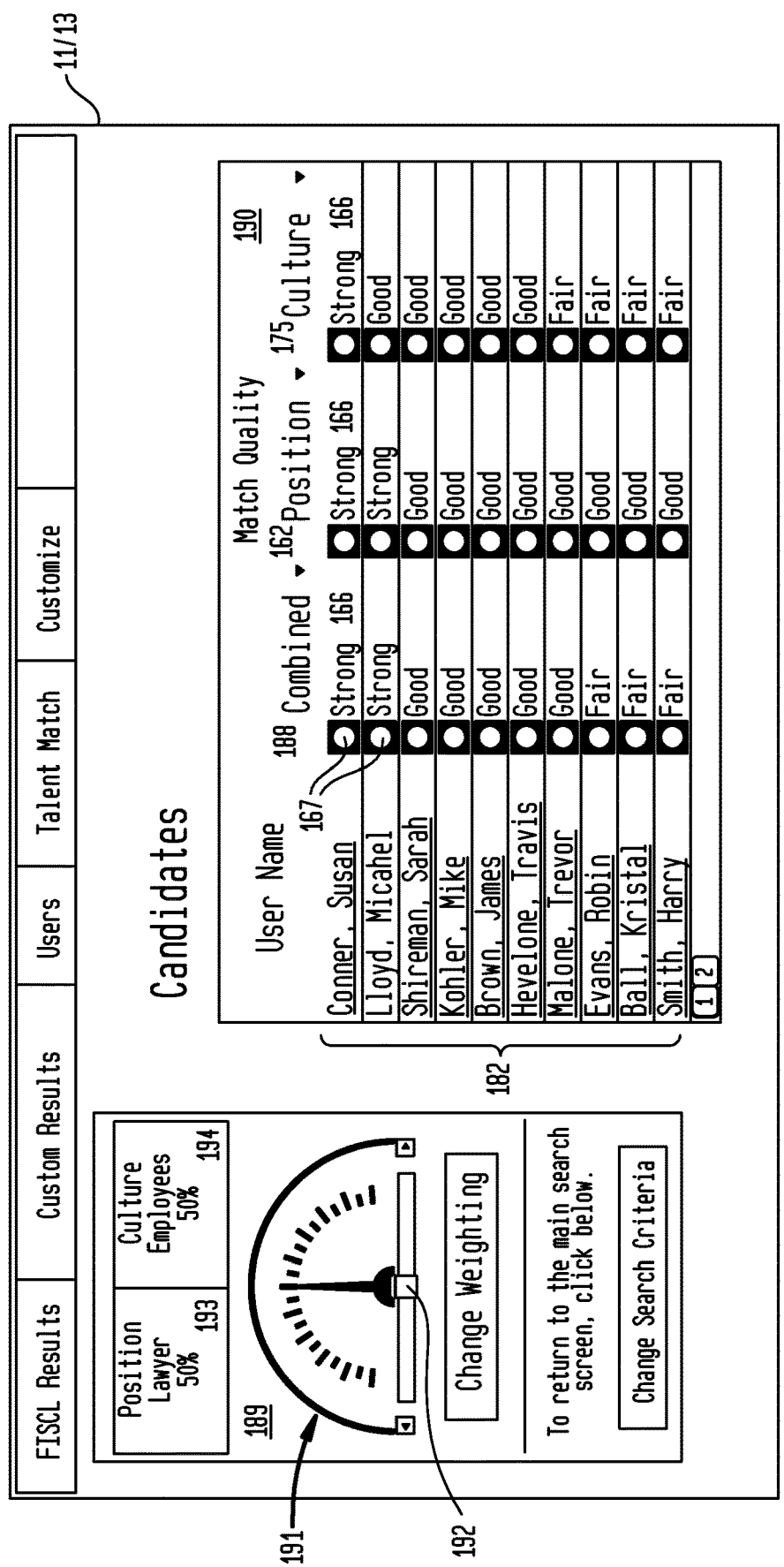
FIG. 19 is an illustration of a particular embodiment of an interactive graphical user interface image which by click event allows weighted use of both user-occupation fit and user-organization fit metrics in comparing a plurality of users against one or a plurality of occupations.

Now referring primarily to FIG. 19, the program code (9) can be further executed to concurrently display in the graphical user interface (11) an occupation-organizational culture weight allocator display area (197) and a user-occupation match display area (198).

As shown in the user-occupation match display area (198), the occupation-organizational fit allocator module (195) can transform the results returned for display by the graphical user interface module (11) as a list of user identifiers (188) each associated with a combined user occupation-organizational culture fit score (196), a user-occupation fit score (157), and an user organizational fit score (183) (as shown in the example of FIG. 19 each having an alpha fit value (176) such as "Strong" and a color code fit values (177); although a numeric fit value (168) in the form of the user-occupation fit score (157), a user-organization fit score (157) or a combined user occupation-organizational fit score (196) could also be utilized).

As shown in the occupation-organizational culture weight allocator display area (197), the occupation-organizational culture fit allocator (193) can take the form of a radial dial (199) having a slider (200) positionable by click event between 100% user-occupation fit (157) and 100% user-organizational fit score (196), as above described, to select a weight percent between 0-100% for each having a sum equal to 100% (which can be take the form of an occupation percentage indicator (201) and an organizational culture percentage indicator (202), as shown in the example of FIG. 19). Adjustment of the occupation-organizational culture weight allocator (193) by click event can cause the occupation-organizational fit allocator module (195) to reorder the list of user identifiers (188) in priority based upon the recalculated combined user occupation-organizational fit score (196).

Again referring primarily to FIG. 20, as to particular embodiments, by click event one of the user identifiers (188) can be selected activate the occupation-organizational fit allocator module (195) to retrieve user data (203) associated with the selected user identifier (188) in the form of a user profile (204) which can include user assessment information (205) related to the user value scores (72), user interest scores (94), user personality scores (114), user workplace preferences scores (136), or the like.

Figure 21:
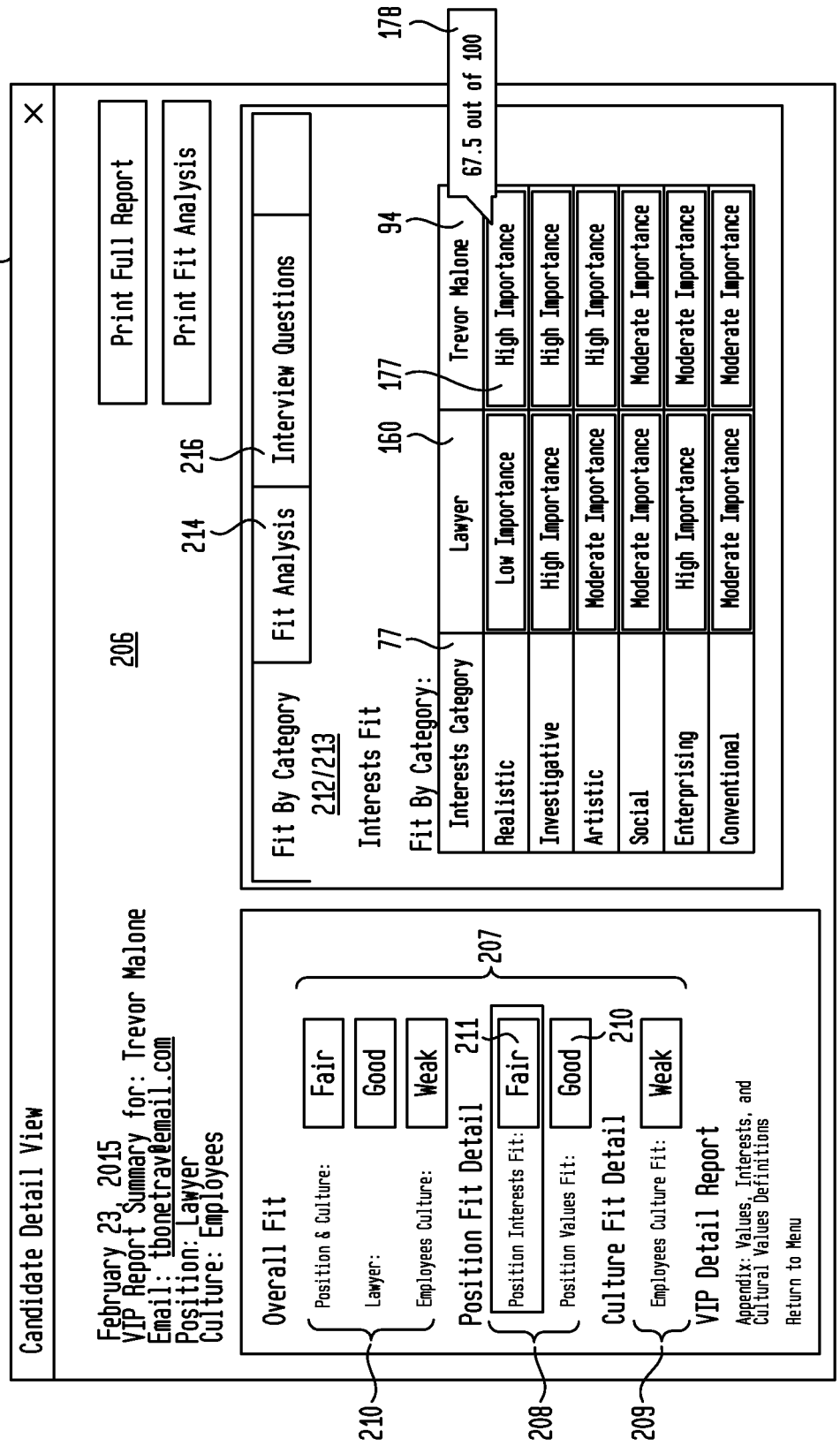
FIG. 21 is an illustration of an interactive graphical user interface image which by click event displays a fit report based on user scores compared to the occupation scores or organization scores for a particular occupation.

Now referring primarily to FIG. 21, as to particular embodiments, by click event on a user identifier (188) the program code (9) can further function to retrieve and display a fit report (206) for the user (16). The fit report (206) can include selectable user fit icons (207) including occupation fit icon (208), organization fit icon (209), or overall occupation-organization fit icon (210). By way of example, the occupation fit icons (208) can further include a user interests fit icon (210) and a user values fit icon (211). By click event on a fit icon (207) a user-occupation assessment report (212) or a user-organization assessment report (213) can be retrieved and displayed based on the fit icon (207) selected. In the illustrative example, selection by click event of a user-interests fit icon (211) for an occupation (138) retrieves and displays the user interests (77), user interests scores (94) and occupation interests scores (160) in a columns and row format for ready comparison. As to certain embodiments, color coded fit values (177) are displayed which by pointer (44) hover over further display the numeric fit values (178). As to particular embodiments, the fit report can further include a fit analysis tab (214).

Now referring primarily to FIG. 22, by click event of the fit analysis tab (214), the program code (9) can further function to generate and display a fit analysis (215) based upon the user-occupation fit scores (157) or user-organization fit scores (183). As to particular embodiments, the fit report (206) can further include an interview questions tab (216).

Now referring primarily to FIG. 23, by click event of the interview questions icon (216), the program code (9) can further function to generate and display interview questions (217). In the illustrative example in which a user interests fit icon (210) has been selected. The interview questions (217) will be based on the user interest scores (94).

As can be easily understood from the foregoing, the basic concepts of the present invention may be embodied in a variety of ways. The invention involves numerous and varied embodiments of a computer implemented method for person attribute valuation and matching with occupations and organizations including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "computer" should be understood to encompass disclosure of the act of "computing"—whether explicitly discussed or not—and, conversely, were there effectively disclosure of the act of "computing", such a disclosure should be understood to encompass disclosure of a "computer" and even a "means for computing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of occupational and organizational fit assessment modules or systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A computer system, comprising:
   a processor;
   a non-transitory memory element;
   a computer readable program code contained in said non-transitory memory element, said program code executable by said processor to:
   depict a graphical user interface on a display surface of a user computing device;
   concurrently depict a values assessment instrument and an interests assessment instrument in said graphical user interface;
   receive user interaction respectively in said values assessment instrument and said interests assessment instrument depicted in a graphical user interface on a display surface of a user computing device;
   analyze user values and user interests associated with an occupation based on user interaction received respectively in said values assessment instrument and said interests assessment instrument depicted in said graphical user interface depicted on said display surface of said user computing device;
   transform said user values and said user interests into user values scores and user interest scores by operation of a values score calculator and an interest score calculator of said program code;
   retrieve user interest scores;
   retrieve standardized occupation interest scores associated with said occupation;
   generate interest scores correlation ratios by operation of a user-occupation matching module of said computer program which correlates said user interest score to said standardized occupation interest scores, wherein said interest scores correlation ratios are calculated by application of ($\eta_i^{xy}$), where:

$$\eta_i^{xy} \equiv \sqrt{\frac{\Sigma_i N_i (\bar{y}_i - \bar{y})^2}{\Sigma_i \Sigma_a (y_{ia} - \bar{y})^2}} \ ;$$

retrieve user values scores;
   retrieve standardized occupation values scores associated with said occupation;
   generate values scores correlation ratios by operation of said user-occupation matching module of said computer program which correlates said user values score to said standardized occupation values scores, wherein said values scores correlation ratios are calculated by application of ($\eta_i^{xy}$), where:

$$\eta_i^{xy} \equiv \sqrt{\frac{\Sigma_i N_i (\overline{y}_i - \overline{y})^2}{\Sigma_i \Sigma_a (y_{ia} - \overline{y})^2}} \;;$$

generate a user-occupation fit score; and depict to user in said graphical user interface a list of occupation identifiers based upon the user-occupation fit score.

2. The system of claim 1, wherein said computer readable program code is further executable to:

normalize said user interest scores and said occupation interest scores; and normalize said user values scores and said occupation values scores to a common ten point scale.

3. The system of claim 2, wherein said computer readable program code is further executable to generate said user-occupation fit score having a value in the range of from 0 to 1.

4. The system of claim 3, wherein said user-occupational fit score is in a range of from 0 to 1, wherein 0 equates to no occupational fit and 1 equates to perfect occupational fit.

5. The system of claim 1, wherein said computer readable program code is further executable to:

apply an interests score allocation factor within a range of 0 to 1 to said interest score; and apply a values score allocation factor within a range of 0 to 1 to said value score, wherein said interests allocation factor and said values allocation factor when summed equal 1.

6. The system of claim 5, wherein said computer readable program code is further executable to:

apply said interest allocation factor equal to about ⅔; and apply said values allocation factor equal to about ⅓.

7. The system of claim 6, wherein said user-occupation fit score is calculated by application of: $F_p = (\frac{2}{3} \eta_{i^{xy}})(\frac{1}{3} \eta_{i^{xy}})$.

8. The system of claim 1, wherein said computer readable program code is further executable to compare said user-occupation fit score to a plurality of occupation scores.

9. The system of claim 8, wherein said computer readable program code is further executable to retrieve occupation identifiers in prioritized order based on comparison of user-occupation fit score to said plurality of occupation scores.

10. The system of claim 1, wherein said occupation interest scores comprise O*NET Online Occupations* occupation interests scores.

11. The system of claim 10, wherein said occupation interest scores comprise O*NET Online Occupations* occupation values scores.

12. The system of claim 1, wherein said computer readable program code is further executable to:

depict a workplace preferences assessment instrument in said graphical user interface;

receive user interaction in said workplace preferences assessment instrument depicted in said graphical user interface;

assess user workplace preferences based on user interaction in a workplace preferences assessment instrument displayed in said graphical user interface on said display surface of said user computing device;

transform assessed user workplace preferences into corresponding user workplace preferences scores by operation of a workplace preferences score calculator of said program code;

assess organization user workplace preferences based on organization user interaction in said workplace assessment instrument displayed in an organization user interactive graphical user interface;

transform assessed organization user workplace preferences into corresponding organization user workplace preferences scores by operation of said workplace preferences score calculator;

retrieve user workplace preferences scores;

retrieve organization workplace preferences scores;

generate workplace preferences scores correlation ratios by operation of a user-occupation matching module of said computer program which correlates said user workplace preferences scores to said organization workplace preferences scores, wherein said workplace preferences scores correlation ratios are calculated by application of ($\eta_i^{xy}$), where:

$$\eta_i^{xy} \equiv \sqrt{\frac{\Sigma_i N_i (\overline{y}_i - \overline{y})^2}{\Sigma_i \Sigma_a (y_{ia} - \overline{y})^2}} \;;$$

generate a user-organizational fit score; and depict to said user in said graphical user interface a list of organizations based upon the user-organization fit score.

13. The system of claim 12, wherein said computer readable program code is further executable to normalize said user workplace preferences scores and said organization workplace preferences scores to a common ten point scale.

14. The system of claim 13, wherein said computer readable program code is further executable to generate said user-organizational fit score having a value in the range of from 0 to 1.

15. The system of claim 12, wherein said computer readable program code is further executable to allocate a weight percent to each of said user-occupation fit score and said user-organizational fit score of between 0 percent and 100 percent, wherein the sum of said weight percent allocated to said user-occupation fit score and said user-organizational fit score equals 100 percent.

16. The system of claim 15, wherein said a user-organizational fit score is calculated by application of: $F_{p^a c^b} = \{a(F_p)\} + \{b(F_c)\}$, wherein where a and b are the percent weights allocated to the user-occupation fit score and user-organizational fit score respectively.

17. The system of claim 12, wherein said plurality of organization users comprise a pre-selected subpopulation of said plurality of organization users.

18. The system of claim 12, wherein said workplace preferences scores comprise pre-selected workplace preferences scores.

* * * * *